(12) United States Patent
Sakaigawa et al.

(10) Patent No.: US 9,523,802 B2
(45) Date of Patent: Dec. 20, 2016

(54) DISPLAY DEVICE

(71) Applicant: Japan Display Inc., Tokyo (JP)

(72) Inventors: Akira Sakaigawa, Tokyo (JP);
Yoneharu Takubo, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/821,188

(22) Filed: Aug. 7, 2015

(65) Prior Publication Data

US 2016/0091642 A1     Mar. 31, 2016

(30) Foreign Application Priority Data

Sep. 26, 2014 (JP) .................................. 2014-196702
Jul. 28, 2015 (JP) .................................. 2015-148348

(51) Int. Cl.
*G02F 1/1333* (2006.01)
*G02B 5/20* (2006.01)
*G02F 1/1335* (2006.01)
*F21V 8/00* (2006.01)

(52) U.S. Cl.
CPC ......... *G02B 5/201* (2013.01); *G02F 1/133514* (2013.01); *G02F 1/133603* (2013.01); *G02B 6/002* (2013.01); *G02B 6/0068* (2013.01); *G02B 6/0073* (2013.01); *G02B 6/0083* (2013.01); *G02F 2001/133614* (2013.01); *G02F 2201/52* (2013.01)

(58) Field of Classification Search
CPC .................... G02F 1/133514; G02F 1/133603; G02B 5/201
See application file for complete search history.

(56) References Cited

U.S. PATENT DOCUMENTS

| 4,946,259 A * | 8/1990 | Matino ............. G02F 1/133514 349/106 |
| 2004/0246265 A1* | 12/2004 | Starkweather .... G02F 1/133514 345/589 |
| 2005/0122445 A1* | 6/2005 | Park .................. G02F 1/133514 349/106 |

(Continued)

FOREIGN PATENT DOCUMENTS

| CN | 202126515 U | 1/2012 |
| JP | 2003-066435 A | 3/2003 |

(Continued)

OTHER PUBLICATIONS

Taiwanese Office Action dated issued Aug. 26, 2016, for Application No. 104131498.

(Continued)

*Primary Examiner* — James Dudek
(74) *Attorney, Agent, or Firm* — Michael Best & Friedrich LLP

(57) ABSTRACT

According to one embodiment, a first substrate includes first to fourth pixel electrodes. A color filter layer includes a red filter opposed to the first pixel electrode, a green filter opposed to the second pixel electrode, a first blue filter opposed to the third pixel electrode and having a peak of transmittance at a wavelength shorter than 460 nm, and a second blue filter opposed to the fourth pixel electrode and having a peak of transmittance at a wavelength longer than 460 nm.

13 Claims, 15 Drawing Sheets

(56) References Cited

U.S. PATENT DOCUMENTS

| | | | | |
|---|---|---|---|---|
| 2005/0253795 A1* | 11/2005 | Moriya | ............... | G02B 5/223 |
| | | | | 345/88 |
| 2008/0204366 A1* | 8/2008 | Kane | ............... | H05B 33/10 |
| | | | | 345/44 |
| 2012/0069551 A1* | 3/2012 | Bues | ............... | G02F 1/133603 |
| | | | | 362/97.2 |

FOREIGN PATENT DOCUMENTS

| | | |
|---|---|---|
| JP | 2011-066534 A | 5/2011 |
| KR | 10-2001-0058170 A | 7/2001 |
| KR | 10-0893348 B1 | 4/2009 |
| KR | 10-2014-0007530 A | 1/2014 |
| KR | 10-2014-0085951 A | 7/2014 |
| TW | 201139343 A | 11/2011 |
| TW | 201201876 A | 1/2012 |
| WO | WO-2010/072415 A1 | 7/2010 |

OTHER PUBLICATIONS

Korean Office Action mailed Oct. 13, 2016, for application serial number 10-2015-0133615.

* cited by examiner

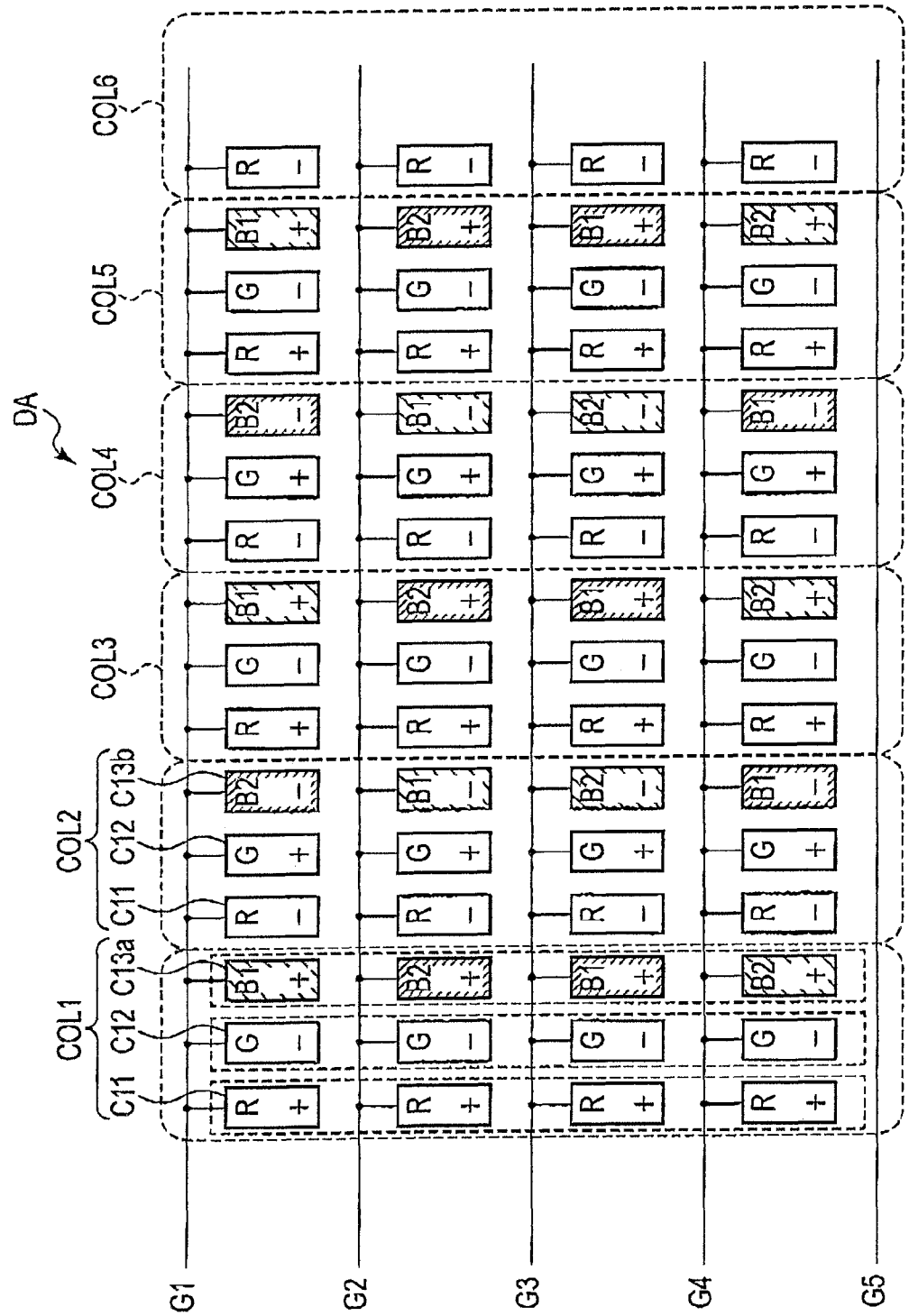
F I G. 4

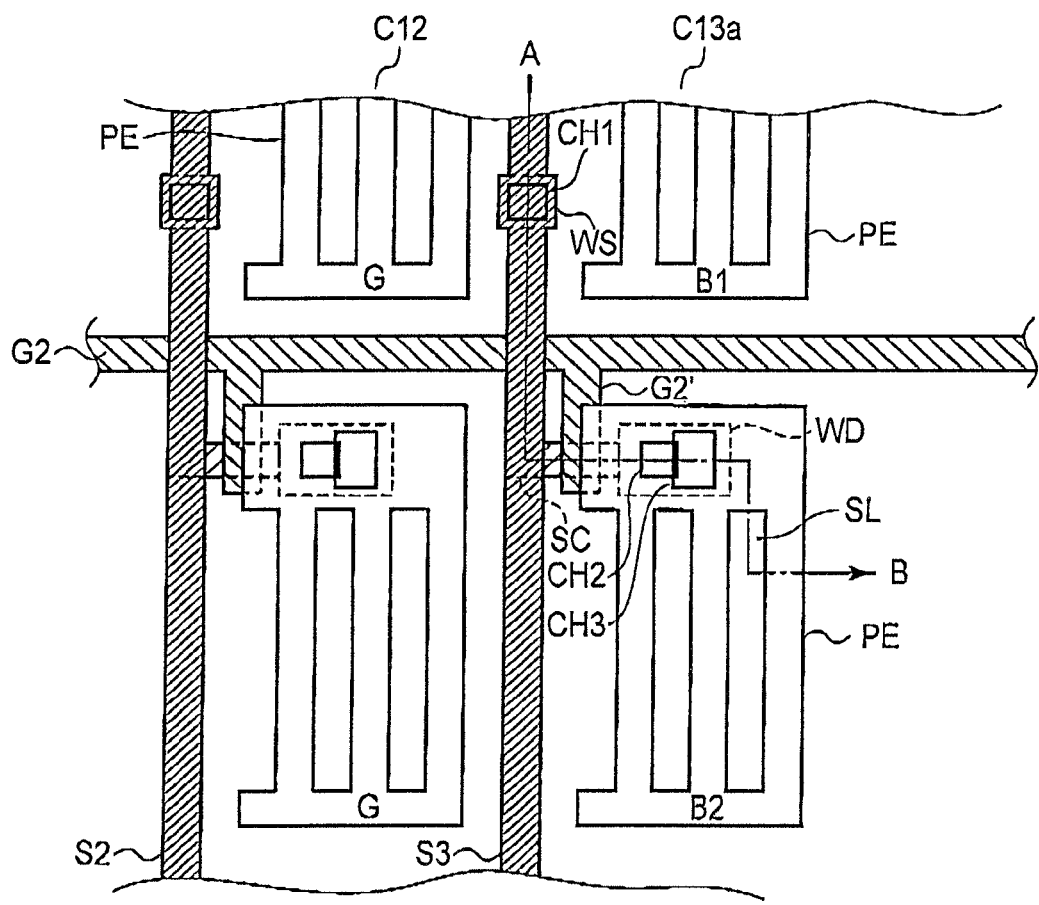
F I G. 6A
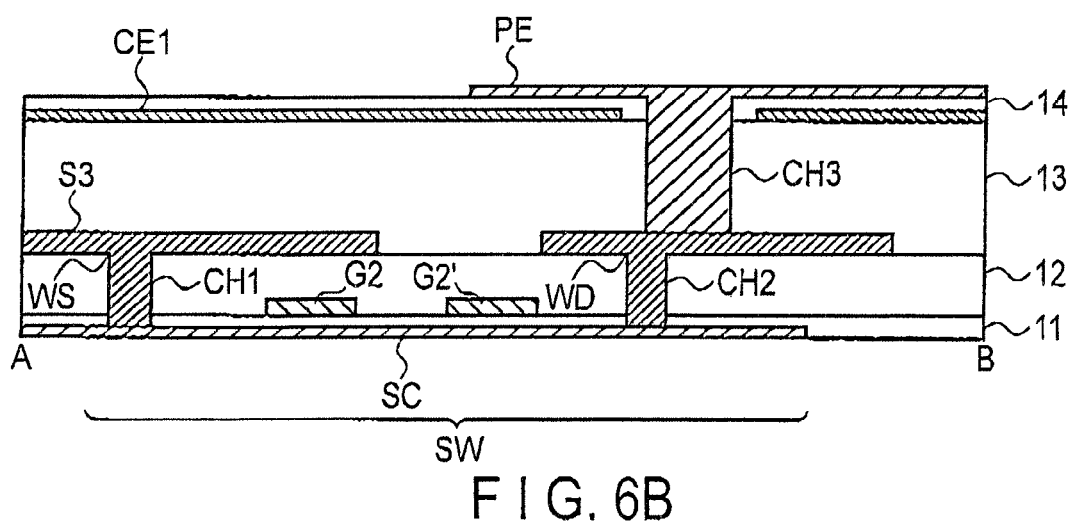
F I G. 6B

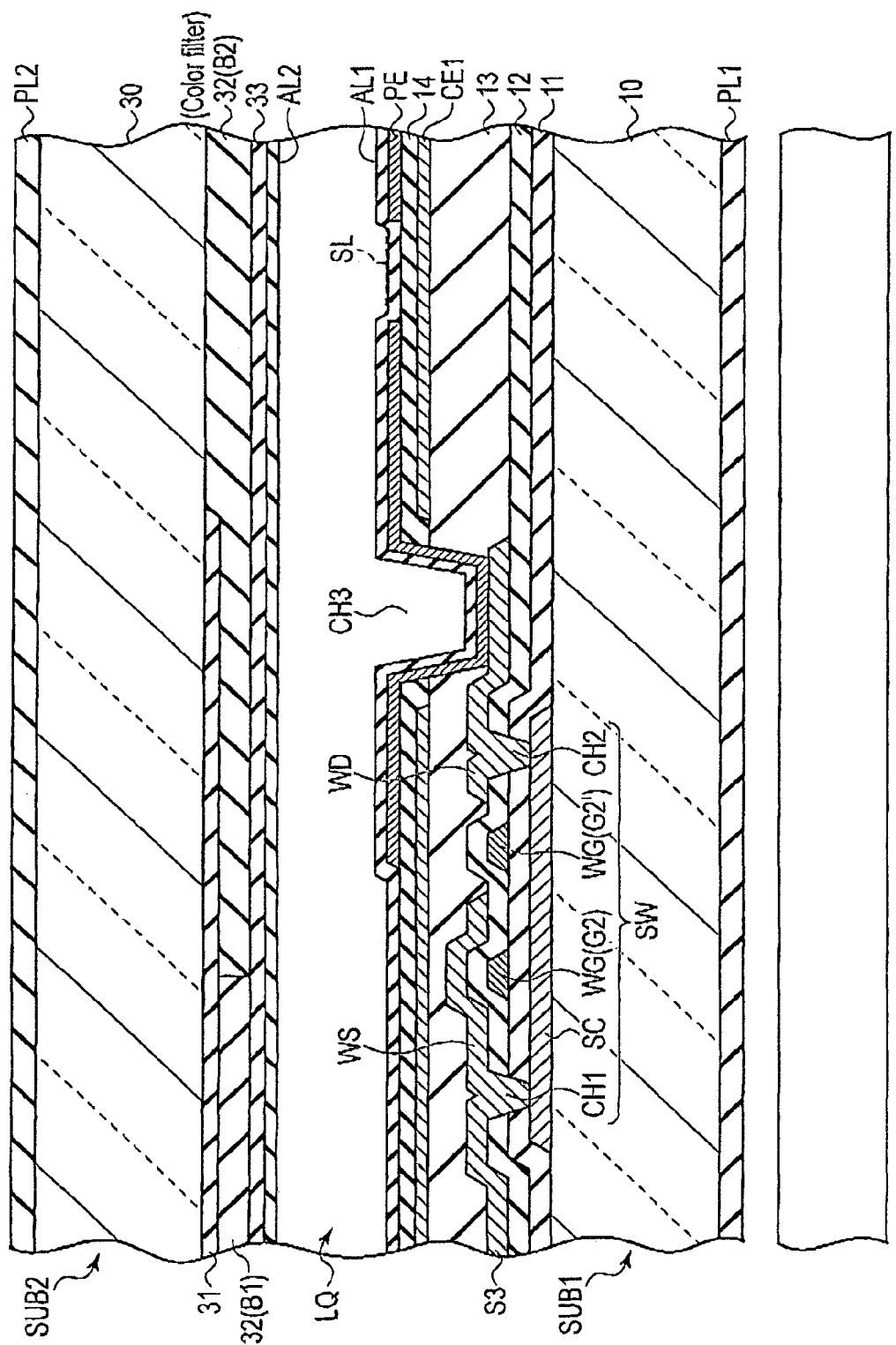
F I G. 7

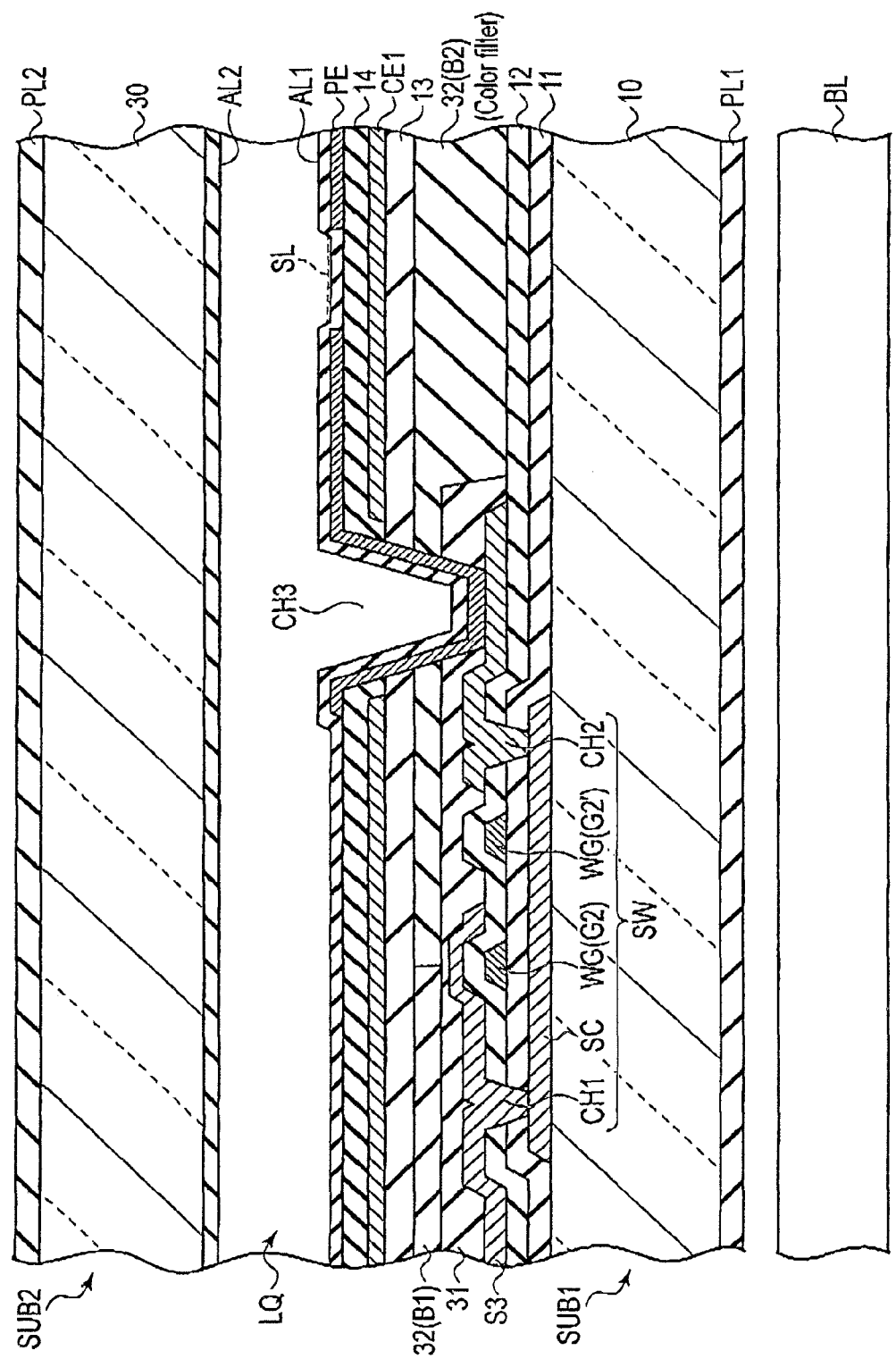
F I G. 8

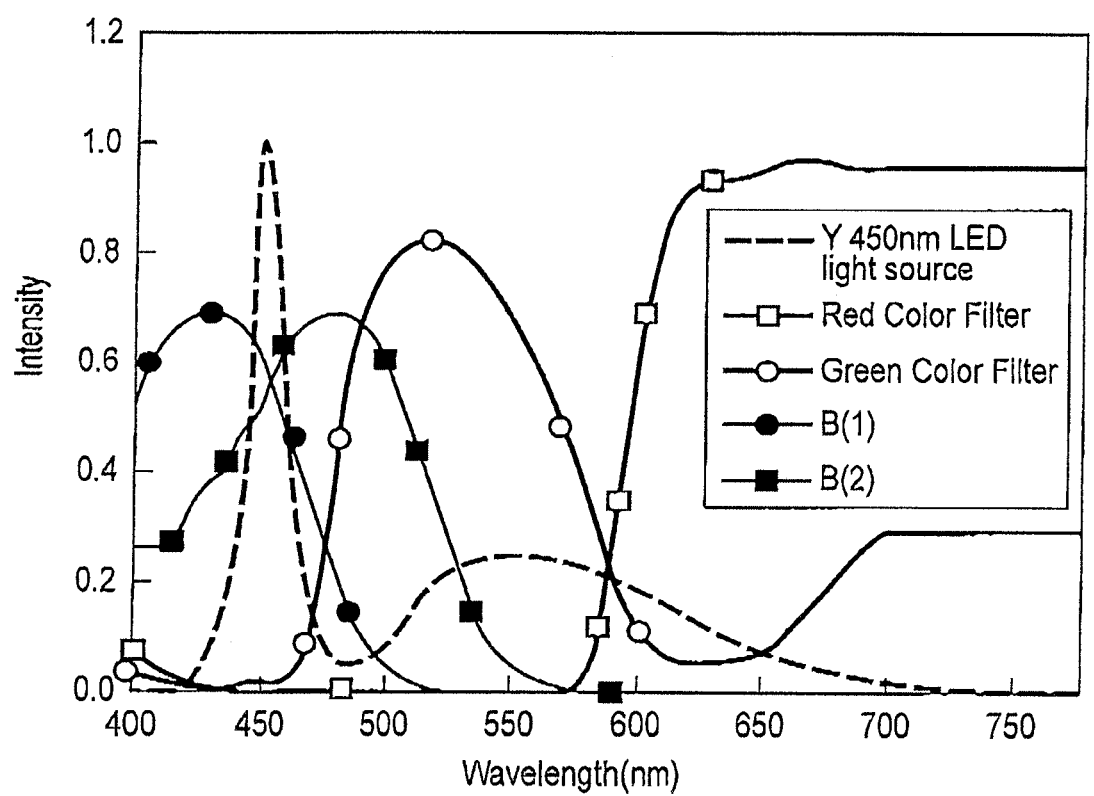
F I G. 13

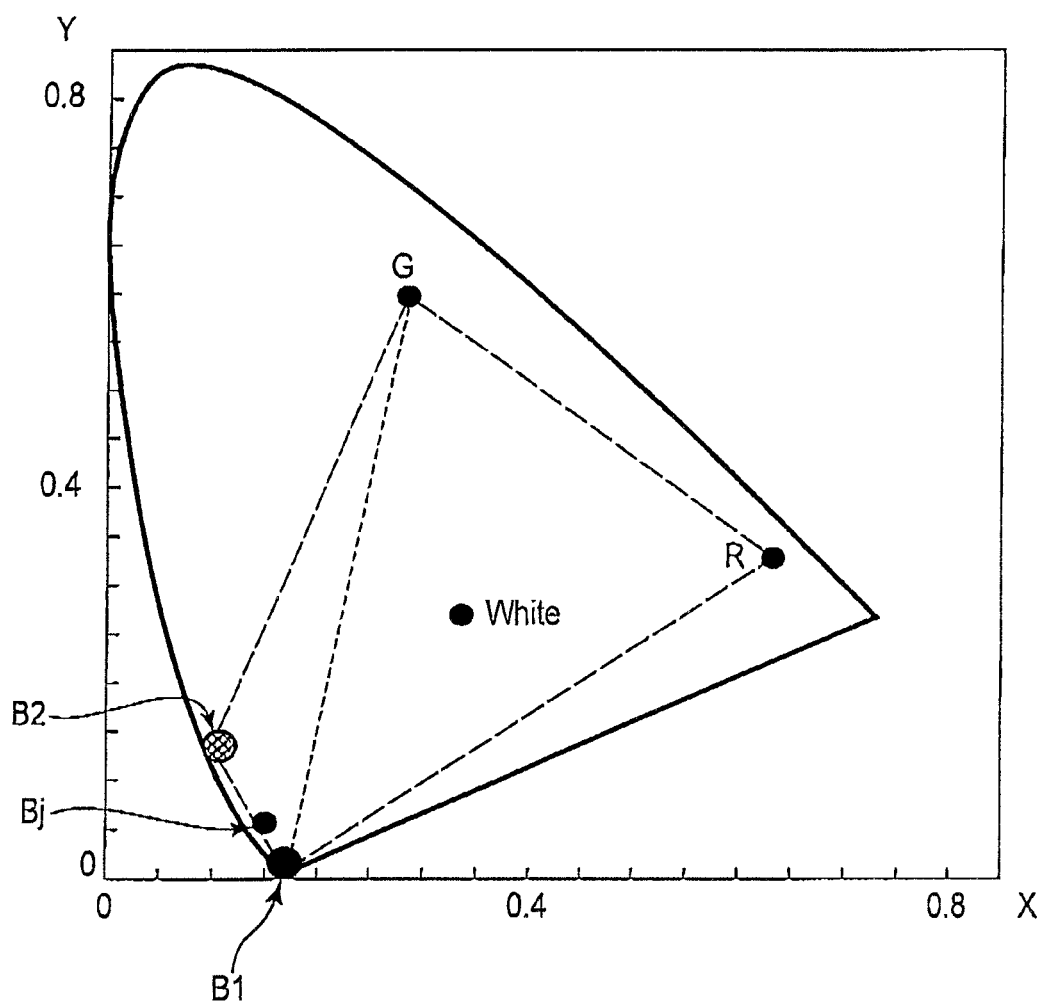
F I G. 14

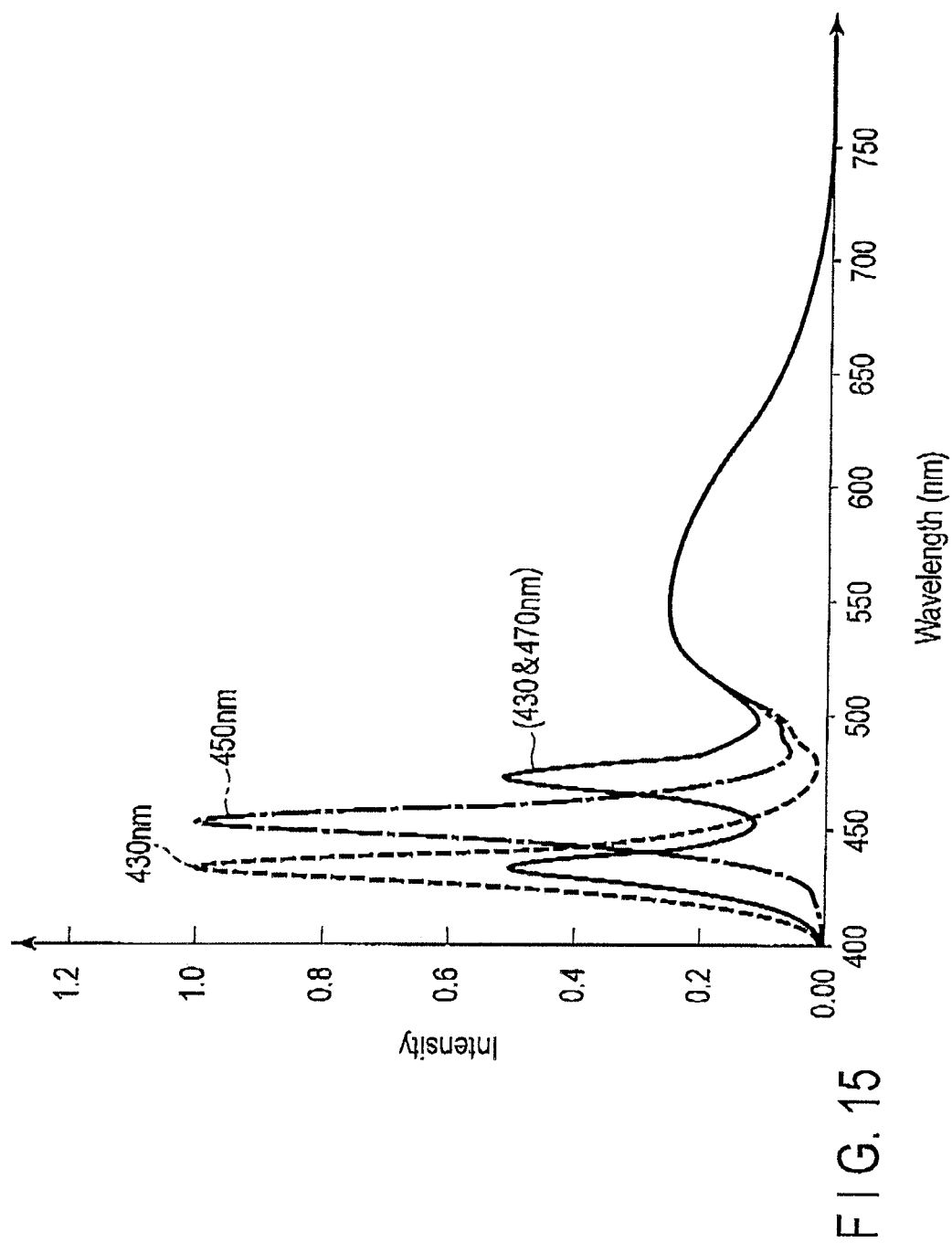
F I G. 15

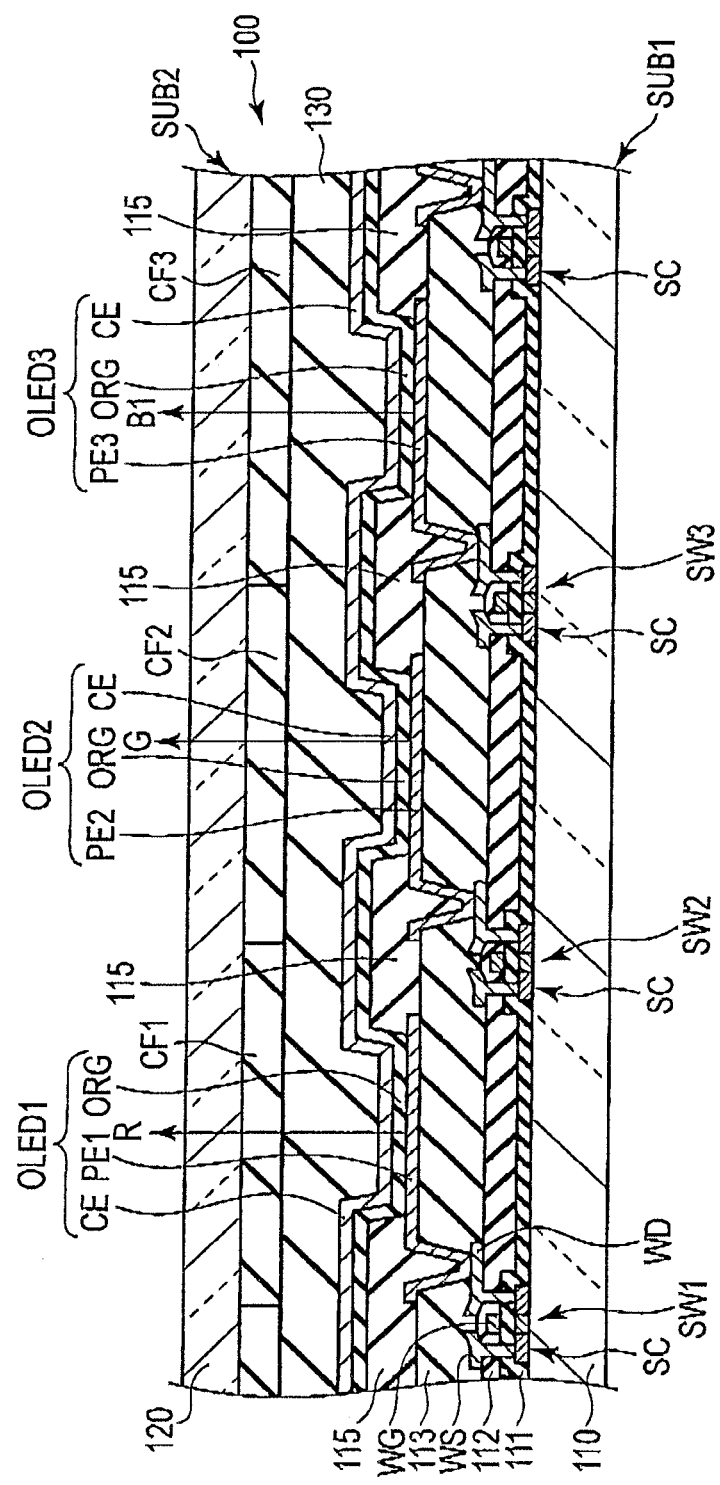
F I G. 17

DISPLAY DEVICE

CROSS-REFERENCE TO RELATED APPLICATIONS

This application is based upon and claims the benefit of priority from Japanese Patent Applications No. 2014-196702, filed Sep. 26, 2014; and No. 2015-148348, filed Jul. 28, 2015, the entire contents of all of which are incorporated herein by reference.

FIELD

Embodiments described herein relate generally to a display device.

BACKGROUND

Mobile devices have recently become popular. The mobile devices include a smartphone, a personal digital assistant (PDA), a tablet computer and the like, and their display function is developed. A variety of display devices, such as a liquid crystal display device, a display device using an LED, a display device using organic EL and a cold cathode-ray tube, have been developed for use in mobile devices. These display devices are capable of displaying color images.

BRIEF DESCRIPTION OF THE DRAWINGS

FIG. 4 is a diagram showing an example of arrangement of color filters on each pixel PX in one embodiment.

FIG. 6A is an enlarged view of rectangular area 1 of FIG. 5, showing a portion close to the source lines S2 and S3 and the gate line G2.

FIG. 6B is a schematic sectional view taken along line A-B of FIG. 6A.

FIG. 7 is a schematic sectional view of a periphery of connecting portions including the switching elements (SW) shown in FIGS. 6A and 6B in one embodiment.

FIG. 8 is a schematic sectional view of a periphery of connecting portions including the switching elements (SW) shown in FIGS. 6A and 6B in another embodiment.

FIG. 13 is a graph showing an example of light intensity characteristics obtained from B1 (first blue), B2 (second blue), R (red) and G (green) pixels in the display device according to the present embodiment.

FIG. 14 is a chromaticity diagram illustrating color representation areas in an example of a display device using B1 and B2 pixels.

FIG. 15 is a graph showing another embodiment and more specifically an example of light intensity characteristics obtained when a plurality of light-emitting diodes LD of different characteristics are used as light sources.

FIG. 17 is a cross-sectional view showing part of a display device according to another embodiment.

DETAILED DESCRIPTION

Figure 1:
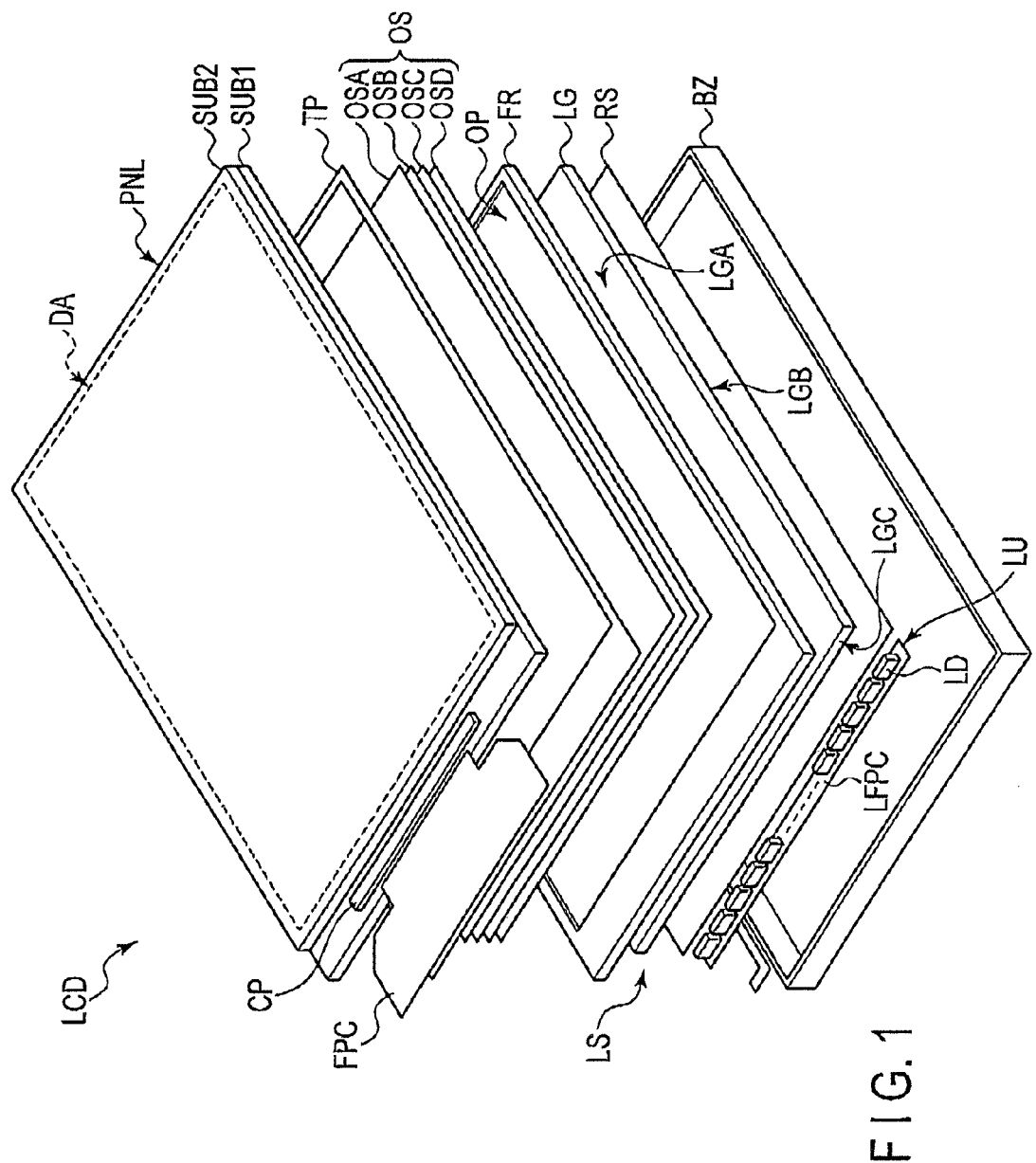
FIG. 1 is an exploded perspective view schematically showing an example of a configuration of a liquid crystal display device LCD according to the present embodiment.

Various embodiments will be described hereinafter with reference to the accompanying drawings.

In color display devices, recently, it has been found that light having a peak at the wavelength of about 460 nm exerts an adverse effect upon cells of human eyes. For example, it is known that when the retina receives light with a wavelength of about 460 nm, melatonin (hormone related to sleep) is controlled to induce insomnia. The light having a peak at the wavelength of about 460 nm is output from an LED light source used in the display devices. In the display devices, therefore, it is desired to prevent light having a peak at the wavelength of about 460 nm from being emitted.

An object of the present embodiment is to provide a display device capable of preventing light having a peak at the wavelength of about 460 nm from being emitted.

According to the present embodiment, a first substrate includes first to fourth pixel electrodes. A second substrate includes a red filter opposed to the first pixel electrode, a green filter opposed to the second pixel electrode, a first blue filter opposed to the third pixel electrode and having a peak of transmittance at the wavelength shorter than 460 nm, and a second blue filter opposed to the fourth pixel electrode and having a peak of transmittance at the wavelength longer than 460 nm.

The present embodiment will specifically be described below. The disclosure of the embodiment is nothing but one example, and a change in matter in the disclosure, which could easily be conceived by a person with ordinary skill in the art without departing from the subject matter of the invention, can be included in the scope of the present invention. The drawings do not define the interpretation of the present invention though they may show, for example, the width, thickness and shape of each component more schematically than in the actual aspect in order to clarify the descriptions. In the specification and drawings, components that fulfill same or similar functions are denoted by the same reference numeral and their overlapping descriptions may be omitted.

FIG. 1 is an exploded perspective view schematically showing an example of a configuration of a liquid crystal display device LCD according to the present embodiment. The liquid crystal display device LCD includes an active matrix liquid crystal display panel PNL, a double-sided tape TP, an optical sheet OS, a frame FR, a light guide plate LG, a light source unit LU, a reflective sheet RS, bezel BZ and the like. A surface light source device LS that illuminates the liquid crystal display panel PNL is configured to include at least the light guide plate LG and light source unit LU.

The liquid crystal display panel PNL includes a flat-shaped first substrate SUB1, a flat-shaped second substrate SUB2 arranged opposite to the first substrate SUB1, and a liquid crystal layer held between the first and second substrates SUB1 and SUB2. The liquid crystal layer is not shown because it is much thinner than the liquid crystal display panel PNL and is located inside a seal member with which the first and second substrates SUB1 and SUB2 are stuck onto each other.

The liquid crystal display panel PNL has a display area DA for displaying images, which is arranged in an area of both a first substrate SUB1 and a second substrate SUB2 are opposite. In the example shown in FIG. 1, the display area DA is rectangular and may be called an active area. The liquid crystal display panel PNL is of a transmission type having a transmission display function of selectively transmitting light from the surface light source device LS to display an image. The liquid crystal display panel PNL can be configured to correspond to a transverse electric field mode using a transverse electric field that is substantially parallel chiefly to the principal surfaces of the substrates, as a display mode or a vertical electric field mode using a longitudinal electric field that is substantially perpendicular chiefly to the principal surfaces of the substrates.

In the example shown in FIG. 1, a drive IC chip CP and a flexible printed circuit board FPC are mounted on the first substrate SUB1 as signal supply sources for supplying signals necessary for driving the liquid crystal display panel PNL.

The optical sheet OS has light transmission and is located behind the liquid crystal display panel PNL and opposed to at least the display area DA. The optical sheet OS includes a diffusion sheet OSA, a prism sheet OSB, a prism sheet OSC and a diffusion sheet OSD. In this example, these sheets OSA to OSD are each formed like a rectangle.

The frame FR is disposed between the liquid crystal display panel PNL and the bezel BZ. In the example shown in FIG. 1, the frame FR is formed like a rectangle and has a rectangular opening OP that is opposed to the display area DA.

The double-sided tape TP is disposed between the liquid crystal display panel PNL and the frame FR outside the display area DA. The double-sided tape TP has, for example, a light-shielding effect and is formed like a rectangle.

The light guide plate LG is disposed between the frame FR and the bezel BZ. The light guide plate LG is flat and has a first principal surface LGA, a second principal surface LGB that is reverse to the first principal surface LGA, and a side surface LGC that connects the first principal surface LGA and second principal surface LGB.

The source unit LU is arranged along the side surface LGC of the light guide plate LG. The light source unit LU includes a plurality of light-emitting diodes LD that serve as light sources, a flexible printed circuit board LFPC on which the light-emitting diodes LD are mounted, and the like. In the example shown in FIG. 1, the light-emitting diodes LD are arranged in line along the side surface LGC which is parallel to the short sides of the light guide plate LG. The light-emitting diodes LD can be arranged along the other side surface (which crosses the side surface LGC) which is parallel to the long sides of the light guide plate LG.

The reflective sheet RS has light reflectivity and is disposed between the bezel BZ and the light guide plate LG. In the example shown in FIG. 1, the reflective sheet RS is shaped like a rectangle.

The bezel BZ contains the foregoing liquid crystal display panel PNL, double-sided tape TP, optical sheet OS, frame FR, light guide plate LG, light source unit LU and reflective sheet RS. In the example shown in FIG. 1, the surface light source device LS is disposed opposite to the backside of the liquid crystal display panel PNL, or the first substrate SUB1, and serves as what is called a backlight.

Figure 2:
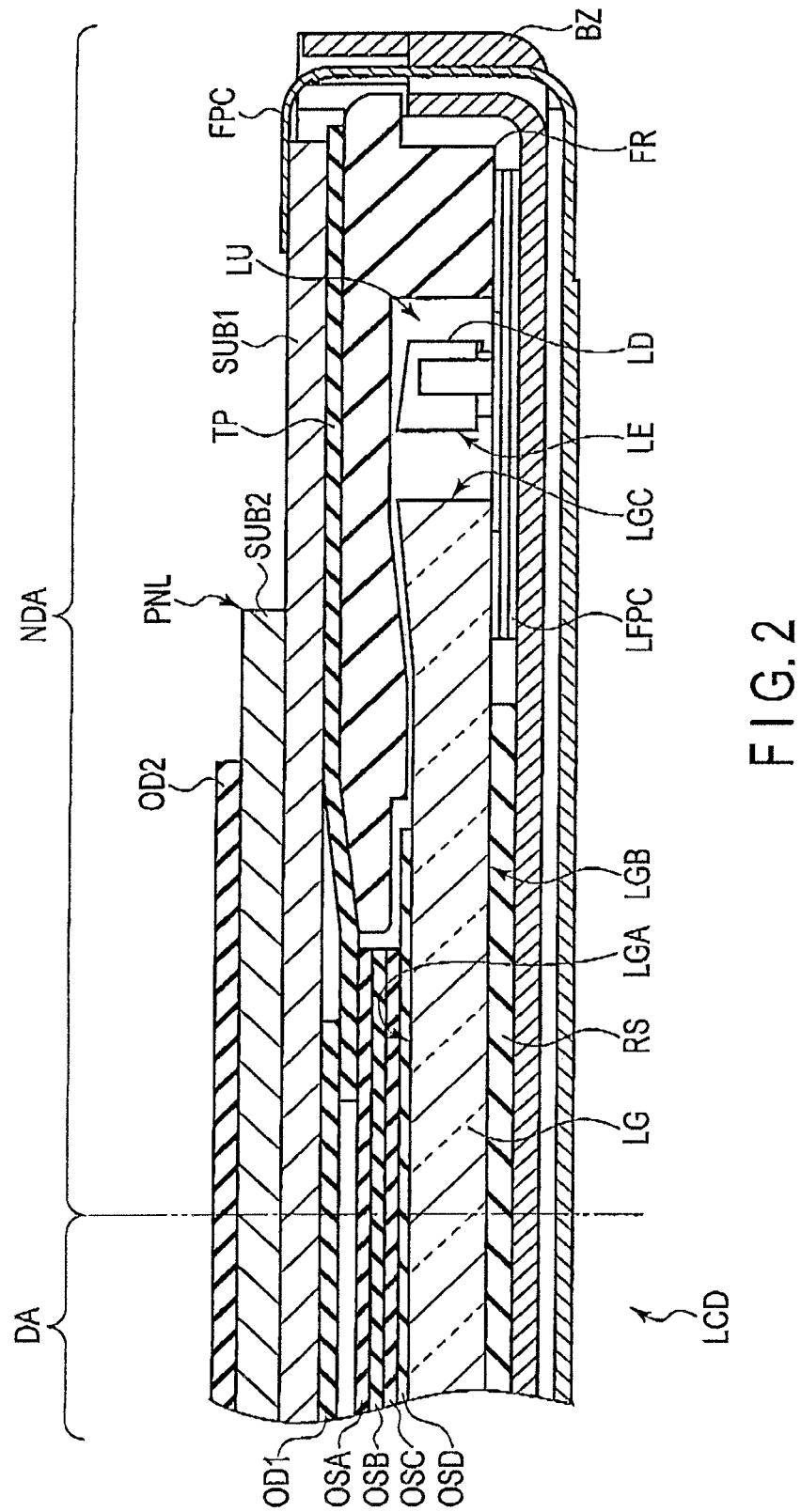
FIG. 2 is a cross-sectional view schematically showing the example of a configuration of a liquid crystal display device LCD shown in FIG. 1.

FIG. 2 is a cross-sectional view schematically showing an example of a configuration of the liquid crystal display device LCD shown in FIG. 1. The liquid crystal display panel PNL, optical sheets OSA to OSD, light guide plate LG and reflective sheet RS extend to not only the display area DA but also a non-display area NDA located outside the display area DA. The light source unit LU and the frame FR are located in the non-display area NDA.

The reflective sheet RS is opposed to the second principal surface LGB of the light guide plate LG. The optical sheets OSA to OSD are stacked one on another between the first principal surface LGA of the light guide plate LG and the liquid crystal display panel PNL.

In the light source unit LU, the flexible printed circuit board LFPC is disposed between the bezel BZ and the light guide plate LG and frame FR. The flexible printed circuit board LFPC is bonded to the second principal surface LGB of the light guide plate LG with a double-sided tape or the like. The light-emitting diodes LD are included in a space between the frame FR and bezel BZ. The light emitting surface LE of each of the light-emitting diodes LD is opposed to the side surface LGC of the light guide plate LG. The side surface LGC corresponds to the incident surface onto which light from the light-emitting diodes LD is incident. The first principal surface LGA that crosses the side surface LGC corresponds to the emitting surface from which light incident upon the side surface LGC is emitted. The liquid crystal display panel PNL is disposed opposite to the first principal surface LGA.

The double-sided tape TP is used to bond the liquid crystal display panel PNL and the frame FR together in the non-display area NDA. The liquid crystal display panel PNL includes a first optical element OD1 bonded to the outer surface of the first substrate SUB1 and a second optical element OD2 bonded to the outer surface of the second substrate SUB2. Each of the first and second optical elements OD1 and OD2 includes at least a polarizing plate. The first optical element OD1 is opposed to an optical sheet (diffusion sheet) ODA.

The second substrate SUB2 includes a color filter, and its configuration will be described in detail below.

Figure 3:
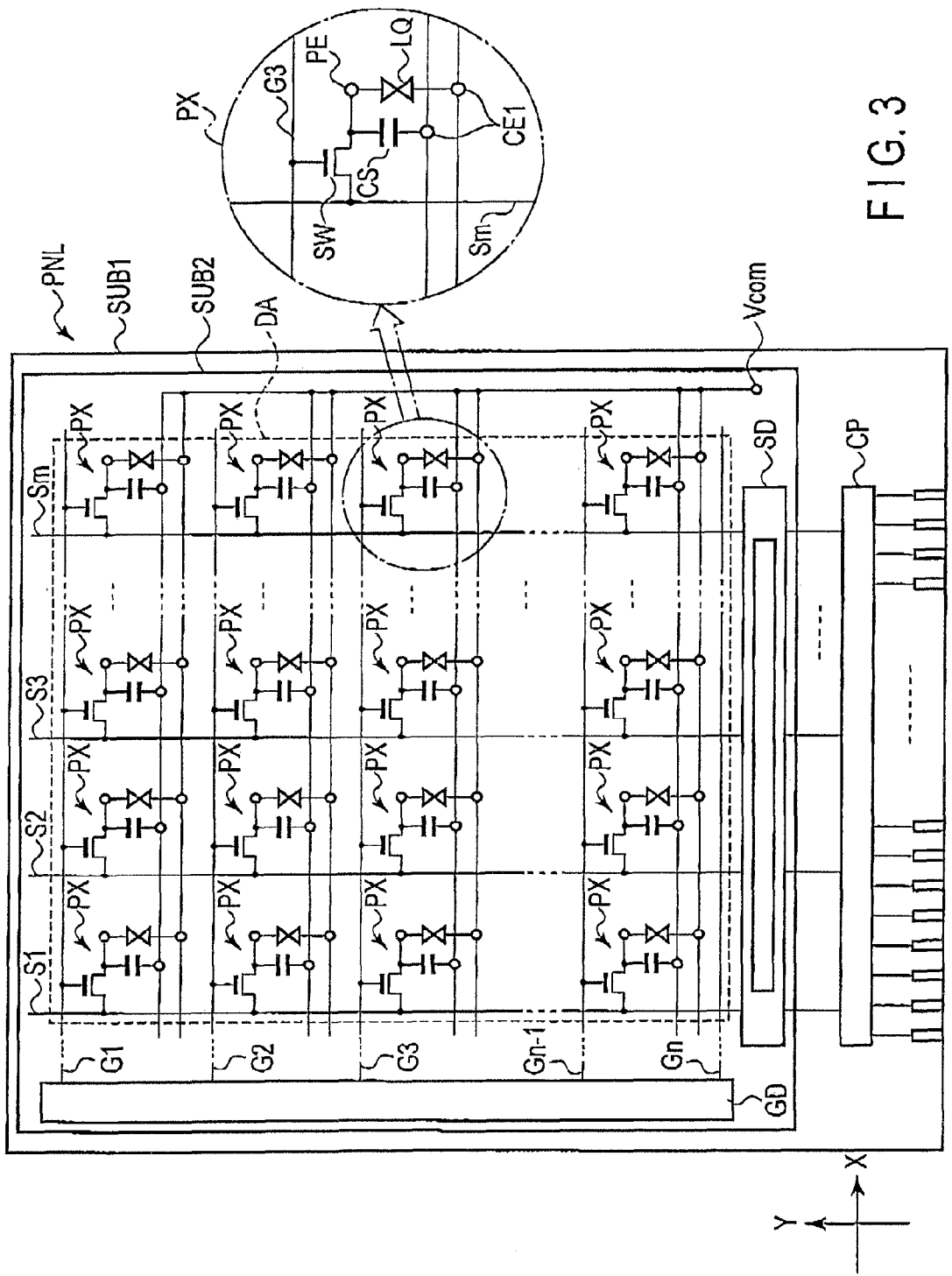
FIG. 3 is a diagram schematically showing a configuration of a liquid crystal display panel PLN and its equivalent circuit.

FIG. 3 is a diagram schematically showing an example of a configuration of a liquid crystal display panel PNL and its equivalent circuit. The display device includes an active matrix liquid crystal display panel PNL. The liquid crystal display panel PNL includes a first substrate SUB1, a second substrate SUB2 opposed to the first substrate SUB1, and a liquid crystal layer LQ held between the first and second substrates SUB1 and SUB2. The display area DA corresponds to an area in which the liquid crystal layer LQ is held between the first and second substrates SUB1 and SUB2. The display area DA is shaped like a rectangle, for example and includes a plurality of pixels PX arranged in matrix.

The first substrate SUB1 includes a plurality of gate lines G (G1 to Gn) extending along a first direction X and a plurality of source lines S (S1 to Sm) extending along a second direction Y that crosses the first direction X.

One of the pixels PX is shown as a representative example on the right side of FIG. 3 (the area surrounded by a one-dot-one-dash line). As shown, each of the pixels PX includes a switching element SW electrically connected to a gate line G and a source line S, a pixel electrode PE electrically connected to the switching element SW, a common electrode CE1 opposed to the pixel electrode PE, a storage capacitor CS and the like. In the representative example, two common electrodes CE1 are shown but actually they are integrated into one electrode. The storage capacitor CS is provided between, for example, the common electrode CE1 and the pixel electrode PE. The second substrate SUB2 is opposed to the first substrate SUB1 with the liquid crystal layer LQ therebetween. The storage capacitor CS can be provided or need not be done when the need arises. When the liquid crystal display device LCD is set in, for example, a fringe field switching (FFS) mode, the pixel electrode PE, the common electrode CE1 and an insulator arranged between them serve as the storage capacitor CS; thus the storage capacitor CS need not be provided.

The gate lines G (G1 to Gn) are drawn outside the display area DA and connected to a first drive circuit GD. The source lines S (S1 to Sm) are drawn outside the display area DA and connected to a second drive circuit SD. For example, at least part of each of the first and second drive circuits GD and SD is formed on the first substrate SUB1, and the circuits GD and SD are connected to a drive IC chip (which is also called a liquid crystal driver) CP.

The second drive circuit SD is capable of outputting pixel signals of different polarities when the pixel signals are supplied to the source lines of adjacent columns in order to achieve a column inversion driving method. The drive IC chip CP includes a controller for controlling the first and second drive circuits GD and SD and serves as a signal supply source for supplying a signal necessary to drive the liquid crystal display panel PNL. In the example shown in FIG. 3, the drive IC chip CP is mounted on the first substrate SUB1 outside the display area DA of the liquid crystal display panel PNL.

The common electrode CE1 extends all over the display area DA and is common to the pixels PX. The common electrode CE1 is drawn outside the display area DA and connected to a feeding point Vcom. The feeding point Vcom is provided on the first substrate SUB1 outside, for example, the display area DA and electrically connected to the common electrode CE1. A fixed common voltage is applied to the feeding point Vcom.

Color filters are regularly arranged in the pixels PX. The color filters are opposed to the pixel electrodes with the liquid crystal layer LQ therebetween and formed on the second substrate SUB2.

FIG. 4 shows an example of color filters arranged in each pixel PX. Hereinafter, a pixel into which the color filters are integrated will be referred to as a color pixel and, more specifically, a pixel into which red (R) filters are integrated, a pixel into which green (G) filters are integrated and a pixel into which blue (B1 or B2) filters are integrated will be referred to as a red (R) pixel, a green (G) pixel and a blue (B1 or B2) pixel, respectively. Accordingly, R, G, B1 and B2 correspond to a red filter, a green filter, a first blue filter and a second blue filter, respectively. In FIG. 4, part of the arrangement of the color filters, such as the source line S (S1 to Sm), is omitted.

In the present embodiment, there is an RGB composite color unit pixel including a first column C11 of R pixels, a second column C12 of G pixels and a third column C13a or C13b of alternate B1 and B2 pixels. The composite color unit pixel includes R, G and B pixels.

The reason why there are two columns C13a and C13b as a third column is as follows. The third column C13a is a column in which first blue (B1) pixels and second blue (B2) pixels are arranged alternately (B1 pixels in odd-numbered rows and B2 pixels in even-numbered rows), whereas the third column C13b is a column in which second blue (B2) pixels and first blue (B1) pixels are arranged alternately (B2 pixels in odd-numbered rows and B1 pixels in even-numbered rows). When viewed in the row direction, it can be said that the B1 pixels and B2 pixels are arranged alternately and repeatedly. In FIG. 4, reference symbols COL1, COL2, COL3, COL4, . . . are added to their respective columns of the composite color unit pixel. The columns COL1, COL2, COL3, COL4, . . . each include a first column C11, a second column C12 and a third column C13a (or C13b). Gate lines (G1, G2, G3, G4, . . . , Gn) are arranged in the row direction to correspond to the respective rows of the composite color unit pixel.

The first blue (B1) filter used in the above B1 pixels has a peak of transmittance at the wavelength shorter than 460 nm. The second blue (B2) filter used in the B2 pixels has a peak of transmittance at the wavelength longer than 460 nm. In the display device, the first blue (B1) pixels and the second blue (B2) pixels play an important role. The use of the first blue (B1) pixels and the second blue (B2) pixels make it possible to provide a display device capable of preventing light having a peak at the wavelength of about 460 nm from being emitted. This is due to the use of the first blue (B1) filter having a peak of transmittance at the wavelength shorter than 460 nm and a second blue (B2) filter having a peak of transmittance at the wavelength longer than 460 nm. The function and advantage of the first blue (B1) pixels and the second blue (B2) pixels will be described in detail below.

Assume here that the first blue has a peak at the wavelength shorter than 460 nm within the range of the wavelength of blue which can be recognized as blue by human eyes and the second blue has a peak at the wavelength longer than 460 nm within that range. More specifically, assume that the first blue has a peak at the wavelength shorter than 460 nm within the range of 435 nm to 495 nm and the second blue has a peak at the wavelength longer than 460 nm within the range of 435 nm to 495 nm.

In FIG. 4, sign "+" or "−" is added to each color pixel and represents a polarity of a pixel signal written to the color pixel. The method of driving a display device by inverting the polarities of pixel signals to alternate like "+, −, +, −, . . ." in each column is called a column inversion driving method. This method is a liquid crystal driving method for making the polarities of drive voltages of adjacent pixel columns different and inverting the polarities for each frame in order to improve in liquid crystal driving efficiency.

The foregoing driving method can bring about the following advantage. Here, pay attention to a process of writing a pixel signal to, e.g., a red (R) pixel. When the gate line G1 is turned on and when viewed in the row direction, pixel signals (minus potentials) are written to the red (R) pixels of columns COL1, COL3, COL5, . . . , and pixel signals (plus potentials) are written to the red (R) pixels of columns COL2, COL4, COL6, . . . . The polarities "+" and "−" of the R pixels are repeated alternately in the row direction. Thus, the polarity of an electrode common to red is not unbalanced or biased toward one of the polarities. In other words, in the red pixel signal writing process, the potential of a common electrode is not biased toward the plus or minus direction. The same advantage can be produced from a process of writing a pixel signal to a green (G) pixel and a process of writing pixels signals to first and second blue (B1 and B2) pixels.

Figure 5:
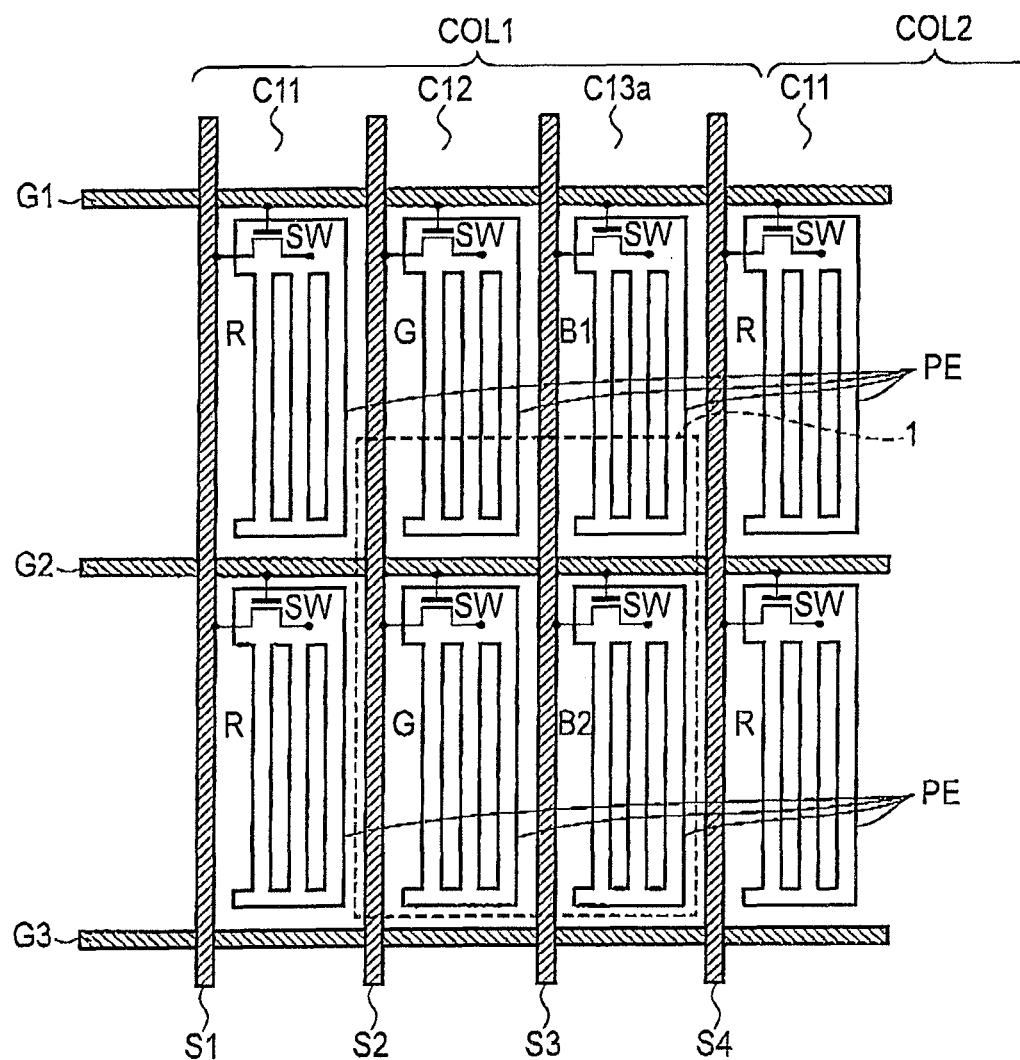
FIG. 5 is a diagram showing column COL1 and part of column COL2 in more detail as a representative example of a structure of a composite color unit pixel as shown in FIG. 4.

FIG. 5 is a diagram showing column COL1 and part of column COL2 in more detail as a representative example of the structure of the composite color unit pixel shown in FIG. 4. In addition to FIG. 4, FIG. 5 shows a structure of the pixel electrodes PE and the source lines S1 to S4. Furthermore, FIG. 5 schematically shows, as a representative example, the periphery of each of connecting portions between the pixel electrodes PE and the source lines S (S1 to S4) corresponding to the pixel electrodes PE and the gate lines G (G1 to G3). Openings are formed in their respective regions divided by the source lines S (S1 to S4) and the gate lines G (G1 to G3). Each of the pixel electrodes PE is provided in its corresponding one of the openings.

The pixel electrodes PE are connected to the source lines S via switching elements SW provided in the connecting portions. The switching elements SW are turned on or turned off in response to control signals from the gate lines G. The structure of the connecting portions will be described in detail with reference to FIGS. 6A and 6B.

FIGS. 6A and 6B show rectangular area 1 of FIG. 5. FIG. 6A is an enlarged view of rectangular area 1 of FIG. 5, showing a portion close to the source lines S2 and S3 and the gate line G2, and FIG. 6B is a schematic sectional view taken along line A-B of FIG. 6A. An area of the second blue (B2) pixel connected to the gate line G2 will be described in detail with reference to FIGS. 6A and 6B.

In the present embodiment, a fringe field switching (FFS) system is employed as one for driving liquid crystal molecules between a pixel electrode PE and a common electrode CE1. The pixel electrode PE has a slit.

The source line S3 is located between insulating films 12 and 13. A semiconductor layer SC is formed below the source line S3 with the insulating films 12 and 11 therebetween. A source electrode WS connected to part of the source line S3 is connected to a source portion of the semiconductor layer SC via a contact hole CH1. The semiconductor layer SC extends below the source line S3 and passes below the gate line G2 and enters an area of the second blue (B2) pixel. This semiconductor layer SC is used as a drain portion.

The gate line G2 is located between the insulating films 11 and 12 below the source line S3. Part of the gate line G2 is projected into a pixel forming area. This part is shown by symbol G2' in FIG. 6B.

The drain portion of the semiconductor layer SC is connected to a drain electrode WD via a contact hole CH2 that penetrates the insulating films 11 and 12. The drain electrode WD is connected to the pixel electrode PE via a contact hole CH3 that penetrates an insulating film 13, a common electrode CE1 and an insulating film 14. The common electrode CE1 is shown in FIG. 6B and not in FIG. 6A.

FIG. 7 is a schematic sectional view of a periphery of connecting portions including the switching elements (SW) shown in FIGS. 6A and 6B.

The first substrate SUB1 is formed by use of a first insulation substrate 10 having light transmission, such as a glass substrate and a resin substrate. The first substrate SUB1 includes a switching element SW, a first common electrode CE1, a pixel electrode PE, a first insulating film 11, a second insulating film 12, a third insulating film 13, a fourth insulating film 14, a first horizontally oriented film AL1 and the like.

In the example shown in FIG. 7, the switching element SW is a top-gate thin film transistor. The switching element SW includes a semiconductor layer SC, which is formed on the first insulation substrate 10. Between the first insulation substrate 10 and the semiconductor layer SC, an undercoat layer serving as an insulating film can be interposed.

The semiconductor layer SC is coated with the first insulating film 11. The first insulating film 11 is formed on the first insulation substrate 10. The first insulating film 11 is formed by inorganic materials such as silicon oxide and nitrogen oxide.

The switching element SW has a gate electrode WG, and the gate electrode WG is formed on the first insulating film 11 and located immediately above the semiconductor layer SC. The gate electrode WG is electrically connected to gate lines G2 and G2' (or it is formed integrally with the gate lines) and coated with the second insulating film 12. The second insulating film 12 is formed on the first insulating film 11. The second insulating film 12 is formed by inorganic materials such as silicon nitride.

The source electrode WS and drain electrode WD of the switching element SW are formed on the second insulating film 12. The source line S3 is also formed on the second insulating film 12. As shown, the source electrode WS is electrically connected to the source line S3 (or it is formed integrally with the source line S3). The source electrode WS and drain electrode WD are brought into contact with the semiconductor layer SC through contact holes CH1 and CH2 that penetrate the first and second insulating films 11 and 12, respectively. The switching element SW is coated with the third insulating film 13 as well as the source line S3. The third insulating film 13 is formed on the second insulating film 12. The third insulating film is formed by, e.g., transparent resin materials.

The common electrode CE1 extends on the third insulating film 13. As shown, the common electrode CE1 is formed over the source line S3 and extends toward its adjacent pixel. The common electrode CE1 is formed by transparent conductive materials such as indium tin oxide (ITO) and indium zinc oxide (IZO). The fourth insulating film 14 is disposed on the common electrode CE1.

In the third and fourth insulating films 13 and 14, a contact hole CH3 is formed to reach the drain electrode WD. The fourth insulating film 14 is thinner than the third insulating film 13 and is formed by inorganic materials such as silicon nitride. The fourth insulating film 14 corresponds to an interlayer insulating film with which the common electrode CE1 is coated.

The pixel electrode PE is formed on the fourth insulating film 14 to have a slit and opposed to the first common electrode CE1. The pixel electrode PE is electrically connected to the drain electrode WD of the switching element SW through the contact hole CH3. The pixel electrode PE is formed by transparent conductive materials such as ITO and IZO. The pixel electrode PE is coated with the first horizontally oriented film AL1.

The second substrate SUB2 is formed using a second insulation substrate 30 having light transmission, such as a glass substrate and a resin substrate. The second substrate SUB2 includes a light-shielding layer 31, a color filter 32, an overcoat layer 33, a second horizontally oriented film AL2 and the like on its side opposed to the first substrate SUB1 of the second insulation substrate 30.

In the light-shielding layer 31, each pixel PX in the display DA is partitioned to form an opening. The light-shielding layer 31 is located in a boundary of color pixels or in a position opposed to the source line provided in the first substrate SUB1. The light-shielding layer 31 is formed by light-shielding metal materials or black resin materials.

The color filter 32 is formed in an opening formed within an area defined by a gate line and a source line and overlaps the light-shielding layer 31. In the example shown in FIG. 7, the color filter 32 is a filter for the B2 pixel and is formed using resin materials that are colored second blue. When the color filter is a red filter, it is formed by resin materials that are colored red. When the color filter is a green filter, it is formed by resin materials that are colored green. When the color filter is a first-blue filter, it is formed by resin materials that are colored first blue.

The red filter is disposed on the R pixel that displays red, the green filter is disposed on the G pixel that displays green, and the first and second blue filters are disposed on their respective B1 and B2 pixels that display blue. The boundary between color filters of different colors is located to overlap the light-shielding layer above the source line.

The color filter 32 is coated with the overcoat layer 33. The overcoat layer 33 is formed to flatten the irregularities of the light-shielding layer 31 and the color filter 32. The overcoat layer 33 is formed by transparent resin materials. The overcoat layer 33 is used as a ground and coated with the second horizontally oriented film AL2.

The first and second horizontally oriented films AL1 and AL2 are formed by materials that exhibit horizontal orientation and has an orientation restricting force for orienting liquid crystal molecules toward the normal direction of the substrates without requiring an orienting process such as rubbing.

The first and second substrates SUB1 and SUB2 as described above are so disposed that the first and second horizontally oriented films AL1 and AL2 are opposed to each other. Between the first and second substrates SUB1 and SUB2, a given cell gap is formed by a columnar spacer formed on one of the substrates. The first and second substrates SUB1 and SUB2 are pasted together by means of a sealing member with a cell gap formed on one of the substrates. The liquid crystal layer LQ is sealed in a cell gap between the first and second horizontally oriented films AL1 and AL2.

A backlight BL is disposed on the back of the liquid crystal display panel having a configuration as described above. Different configurations can be applied to the backlight BL, but a detailed description of the configurations of the backlight BL is omitted here.

A first optical element including a first polarizing plate PL1 is disposed on the outer surface of the first insulation substrate 10. A second optical element including a second polarizing plate PL2 is disposed on the outer surface of the second insulation substrate 30. The first and second polarizing plates PL1 and PL2 are so disposed that their polarizing axes cross each other or they are located in a cross-Nicole state, for example.

In FIG. 7, for example, the switching element SW, pixel electrode PE and common electrode CE1 are arranged in the first substrate SUB1, and the layer of the color filter 32 is formed in the second substrate SUB2 opposed to the first substrate SUB1. In other words, FIG. 7 shows an example in which the layer of the color filter 32 is formed in the substrate opposed to an array substrate.

However, the display device according to the present embodiment is not limited to a structure in which the layer of the color filter is formed in the opposed substrate, but can be applied to a structure in which the layer of the color filter is disposed in the array substrate, or what is called a color filter on array (COA) structure.

FIG. 8 shows an example of the liquid crystal display according to the present embodiment, which is manufactured to have a COA structure. In the example shown in FIG. 8, the layer of color filter 32 is formed between second and third insulating films 12 and 13 as shown in FIG. 7.

In FIG. 8, the layer of color filter 32 is formed to cover the source line S, gate line, switching element SW and the like. The layer of color filter 32 is formed in each of the pixels and its part is formed on a black matrix 31. The black matrix 31 is basically formed to cover the source line S, the gate line G and part of the switching element SW.

As described above, the red (R) filter, green (G) filter, first blue (B1) filter and second blue (B2) filter are provided in each of the pixels as the layer of color filter 32.

In the first substrate SUB1 that is an array substrate, irregularities due to the arrangement of the switching element SW, gate line G, source line S, black matrix and color filter layer are flattened by the third insulating film 13. As compared with the arrangement of the black matrix and color filter layer on the opposed substrate, an overcoat layer for flattening the opposed substrate becomes unnecessary, with the result that the display device can be decreased in thickness, weight and cost.

Figure 9:
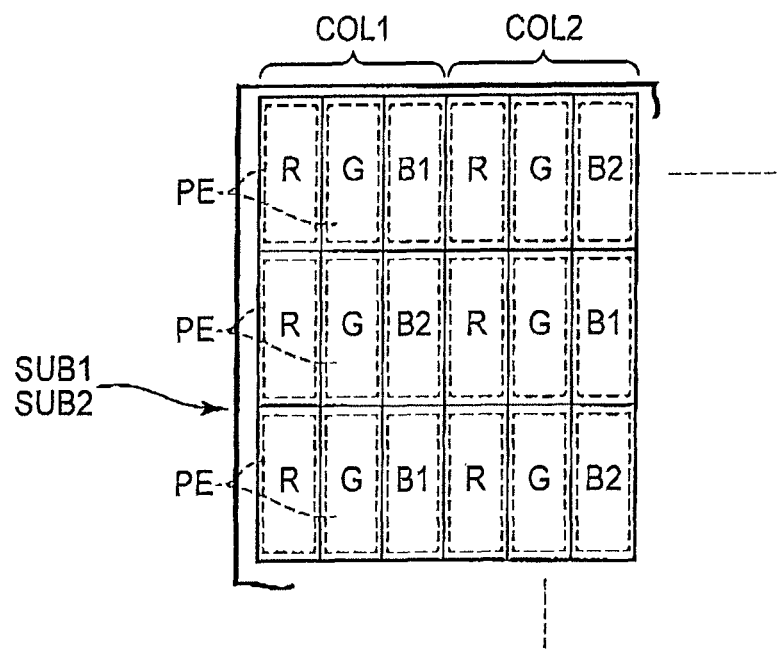
FIG. 9 is a diagram showing an example of part of a color pixel array according to one embodiment.

FIG. 9 shows a main part of the display device according to one embodiment. In the display device, the first substrate SUB1 includes first to fourth pixel electrodes. For example, the first pixel electrode is an R pixel electrode, the second pixel electrode is a G pixel electrode, the third pixel electrode is a B1 pixel electrode and the fourth pixel electrode is a B2 pixel electrode. In FIG. 9, a representative example of the pixel electrodes is denoted by PE and accordingly the first to fourth pixel electrodes are denoted by PE1 to PE4.

The red (R) filter, green (G) filter, first blue (B1) filter and second blue (B2) filter, which are provided on the second substrate SUB2, are opposed to the first, second, third and fourth pixel electrodes (PE), respectively. The first blue (B1) filter is opposed to the third pixel electrode and has a peak of transmittance at the wavelength shorter than 460 nm. The second blue (B2) filter is opposed to the fourth pixel electrode and has a peak of transmittance at the wavelength longer than 460 nm. For example, the first blue (B1) filter has a peak of transmittance at the wavelength of 430 nm, and the second blue (B2) filter has a peak of transmittance at the wavelength of 470 nm. This structure makes it possible to achieve a display device that prevents light having a peak at the wavelength of about 460 nm from being emitted. A pixel including R, G and B filters in this display device is referred to as a composite color pixel and, in this embodiment, color balance is obtained by two composite color pixels (2R, 2G, B1, B2).

In the embodiment shown in FIG. 9, the area of the red (R) and green (G) filters is the same as that of the first blue (B1) and second blue (B2) filters. This embodiment is one example, and a display device that prevents light having a peak at the wavelength of about 460 nm from being emitted, can be attained from the structure shown in FIG. 10. FIG. 9 shows the first and second substrates SUB1 and SUB2 which are stacked one on the other. In the following description, the area of a pixel and that of a color filter are equal to each other.

Figure 10:
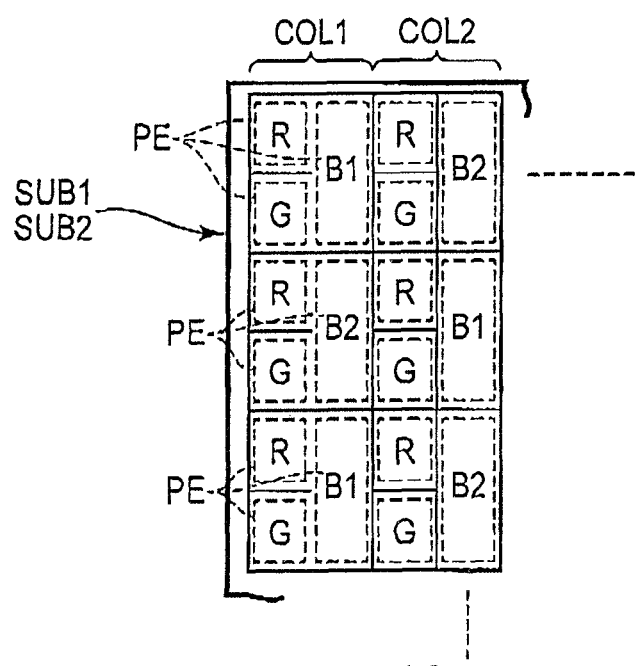
FIG. 10 is a diagram showing an example of part of a color pixel array according to another embodiment.

In the embodiment shown in FIG. 10, R and G pixels are alternately arranged in a first column, and first blue (B1) and second blue (B2) pixels are alternately arranged in a second column. In the row direction, too, the first blue (B1) and second blue (B2) pixels are alternately arranged. The area of the first blue (B1) pixel and that of the second blue (B2) pixel are the same, whereas the area of the R pixel and that of the G pixel are each smaller than that of the first blue (B1) pixel (or the second blue (B2) pixel) and, for example, the former area is half the latter area. As described above, a pixel including R, G and B filters is referred to as a composite color pixel and in this embodiment color balance is obtained by two composite color pixels (2R, 2G, B1 and B2). FIG. 10 also shows the first and second substrates SUB1 and SUB2 which are stacked one on the other.

Figure 11:
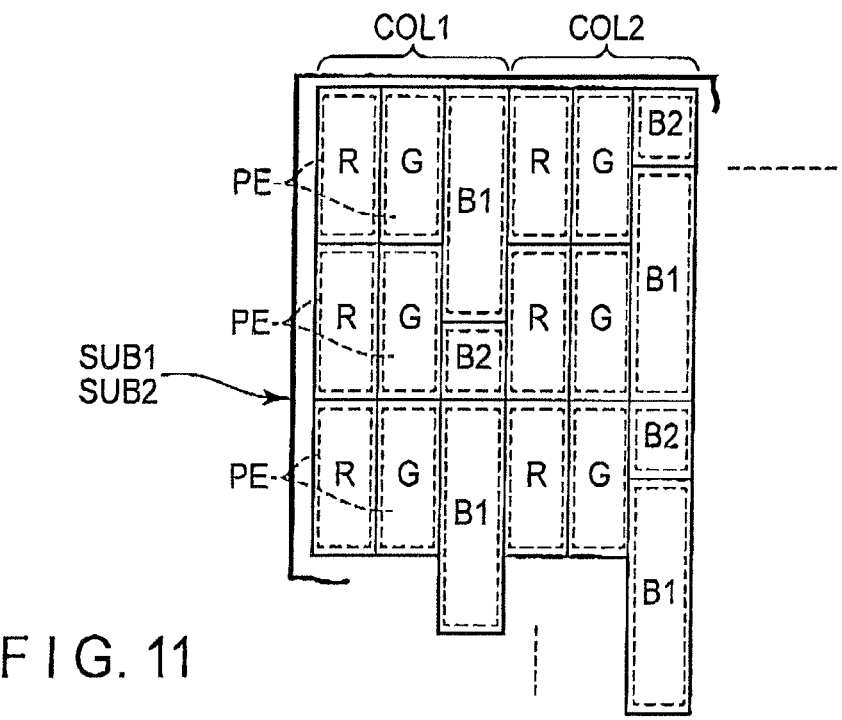
FIG. 11 is a diagram showing an example of part of a color pixel array according to still another embodiment.

FIG. 11 shows still another embodiment. In this embodiment, R pixels are arranged in a first column and G pixels are arranged in a second column. In a third column, first blue (B1) and second blue (B2) pixels are alternately arranged. The area of the B1 pixel is larger than that of the B2 pixel. For example, the area of the R pixel and that of the G pixel are the same. The area of the B1 pixel is larger than that of the B2 pixel, and the area of the B1 pixel is larger than that of the R pixel and that of the G pixel, and the area of the B2 pixel is smaller than that of the R pixel and that of the G pixel. More specifically, the area of the B1 pixel is 1.5 times as large as that of the R pixel or G pixel, and the area of the B2 pixel is 0.5 times as large as that of the R pixel or G pixel. If the area ratio between the B1 and B2 pixels is controlled, the amount of light transmission can be controlled. In this embodiment, too, the B1 and B2 pixels are alternately arranged in the row direction. FIG. 11 also shows the first and second substrates SUB1 and SUB2 which are stacked one on the other.

Figure 12:
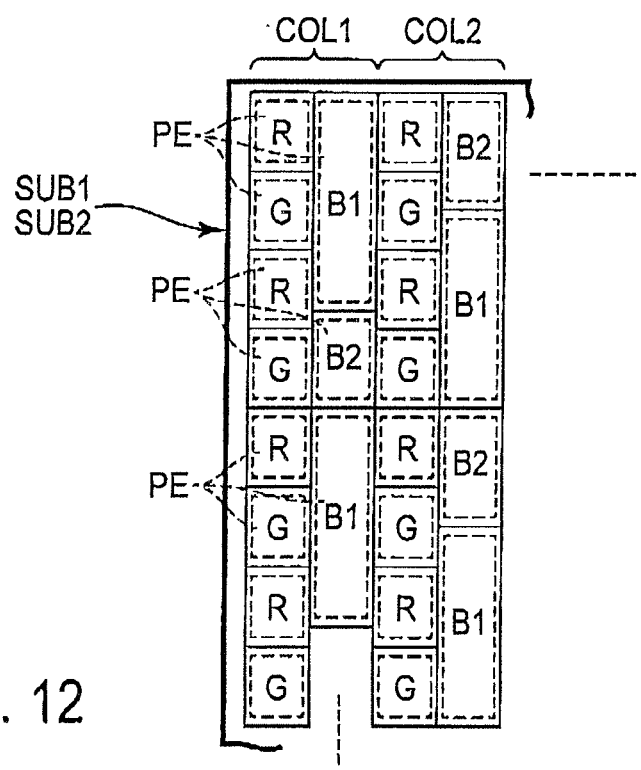
FIG. 12 is a diagram showing an example of part of a color pixel array according to yet another embodiment.

FIG. 12 shows yet another embodiment. In this embodiment, R and G pixels are alternately arranged in a first column and first blue (B1) and second blue (B2) pixels are alternately arranged in a second column. In the row direction, too, the first blue (B1) and second blue (B2) pixels are alternately arranged. For example, the area of the R pixel and that of the G pixel are the same, the area of the B1 pixel is larger than that of the B2 pixel, the area of the B1 pixel is larger than those of both the R and G pixels, and the area of the B2 pixel is smaller than that of the R pixel and that of the G pixel. More specifically, the area of the B1 pixel is two thirds of the total area of two R pixels and two G pixels. Furthermore, the area of the B2 pixel is one third of the total area of the area for two R pixels and the area for two G pixels. In other words, the area ratio of the B1 pixel to the B2 pixel is 2:1. Moreover, the same area as the total area of the B1 pixel and the B2 pixel is acquired in the next column. The acquired area is divided into four. Two of the G pixels and two of the R pixels are assigned to the above-mentioned four. When the total area of the B1 pixel and the B2 pixel is 3, the area of the B1 pixel is two thirds of the total area, and the area of the B2 pixel is one third of the total area. Furthermore, the area of each of the R pixel and the G pixel is set as ¾=0.75 of the area of the B2 pixel. In this embodiment, color balance is obtained by two composite color pixels (4R, 4G, 2B1 and 2B2). FIG. 12 also shows the first and second substrates SUB1 and SUB2 which are stacked one on the other.

FIG. 13 is a characteristic graph showing intensity characteristics of light obtained from B1, B2, R and G pixels in the display device according to the present embodiment. In FIG. 13, the curve with black circles and the curve with black squares represent the intensity characteristics of light emitted from B1 pixels and those of light emitted from B2 pixels, respectively. The curve with white squares and the curve with white circles represent the intensity characteristics of light emitted from R pixels and those of light emitted from G pixels, respectively. The dotted curve, which represents the intensity characteristics of light emitted from light-emitting diodes (LD), is shown for reference.

As is seen from the characteristics graph, the display device according to the present embodiment is capable of preventing light having a peak at the wavelength of about 460 nm from being emitted. In this embodiment, for example, a blue (B1) pixel having a peak of emission light at the wavelength of 430 nm and a blue (B2) pixel having a peak of emission light at the wavelength of 470 nm are used, but the present invention is not limited to this embodiment. The original objective can be attained even by use of only a blue pixel having a peak at the wavelength shorter than 460 nm or only a blue pixel having a peak at the wavelength longer than 460 nm. If two blue pixels having a peak at the wavelength shorter than 460 nm and a peak at the wavelength longer than 460 nm are used, the display device is capable of preventing light having a peak at the wavelength of about 460 nm from being emitted more effectively.

FIG. 14 is a chromaticity diagram illustrating color representation areas in an example of a display device using B1 and B2 pixels. Basically, different colors are represented by the three primary colors of R, G and B1. In the display device of the present embodiment, a B2 pixel is used in addition to a B1 pixel for blue color representation and thus a blue color is represented with reference to color Bj on a line connecting the two pixels. Accordingly, the area of color represented by the three primary colors of R, G and B1 can be enlarged. The display device of the present embodiment makes it possible to prevent light having a peak at the wavelength of about 460 nm from being emitted.

FIG. 15 is a graph showing another embodiment. More specifically, the graph shows an example of light intensity characteristics obtained when a plurality of light-emitting diodes LD of different characteristics are combined. In this embodiment, the combination of the light-emitting diodes LD of different characteristics makes it possible to prevent light having a peak at the wavelength of about 460 nm from being emitted. As the light-emitting diodes LD, a light-emitting diode having a peak of emission light at the wavelength of 430 nm and a light-emitting diode having a peak of emission light at the wavelength of 470 nm are incorporated into a light source unit LU as shown in FIG. 1. If such a light source unit LU is employed, the emission light characteristics indicated by the solid-line curve in FIG. 15 can be obtained. In FIG. 15, the emission light characteristics of light-emitting diodes having a peak of emission light at the wavelength of 430 nm (the curve indicated by the dotted line) and those of light-emitting diodes having a peak of emission light at the wavelength of 450 nm (the curve indicated by the one-dot-one-dash line) are shown for reference.

In the embodiment, at least a first white light source which is opposed to the incident surface of the light guide plate LG shown in FIG. 1 and which has a peak of emission spectrum at the wavelength shorter than 460 nm and a second white light source which is opposed to the incident surface and which has a peak of emission spectrum at the wavelength longer than 460 nm are used. It is thus possible to prevent light having a peak at the wavelength of about 460 nm from being emitted. The first and second white light sources can be achieved by a blue light-emitting diode and a yellow fluorescent substance.

Even though the characteristics of a plurality of light-emitting diodes LD that serve as light sources as described above are selected, light having a peak at the wavelength of about 460 nm can be prevented from being emitted. This objective can be attained even though the prior art RGB filter is used as a color filter. If, however, the foregoing embodiment using B1 and B2 pixels and the embodiment in which the characteristics of a plurality of light-emitting diodes LD are selected are combined with each other, a display device that attains the objective more effectively can be obtained.

As the light sources (first and second white light sources), quantum dots can be used in place of the light-emitting diodes. The quantum dots are able to generate an arbitrary peak over a short-wavelength area from a long wavelength. Furthermore, as the light sources (first and second white light sources), an illuminant (organic light-emitting diode: OLED) using organic electroluminescence (EL) materials can be used in place of the light-emitting diodes.

In the foregoing embodiment, two different light-emitting diodes, or a light-emitting diode having a peak of emission light at the wavelength of 430 nm and a light-emitting diode having a peak of emission light at the wavelength of 470 nm are used, but a plurality of light-emitting diodes having no peak of emission light at the wavelength of about 460 nm can be used in combination. For example, four different light-emitting diodes having peaks of emission light at the multiple wavelengths of 410 nm, 430 nm, 450 nm and 470 nm can be used. The wavelengths need not be arranged at regular intervals; however, if light sources having a peak at the shorter wavelength and a peak at the longer wavelength with reference to the wavelength of 460 nm are used, the energy intensity at the wavelength of about 460 nm can effectively be suppressed. This structure can be combined with the structure of the combination of B1 and B2 pixels as described in the foregoing embodiment, which makes it possible to suppress the energy intensity at the wavelength of about 460 nm more effectively.

The present invention is not limited to the above-described embodiments. When the B1 and B2 pixels are used as illustrated in FIGS. 9, 10, 11 and 12, if blue color signals are supplied to the B1 and B2 pixels as they are like the conventional blue color pixel signals, no desired or expected color representation could be obtained. It is thus desirable to generate pixel signals suitable for the pixel array patterns shown in FIGS. 9-12.

Figure 16:
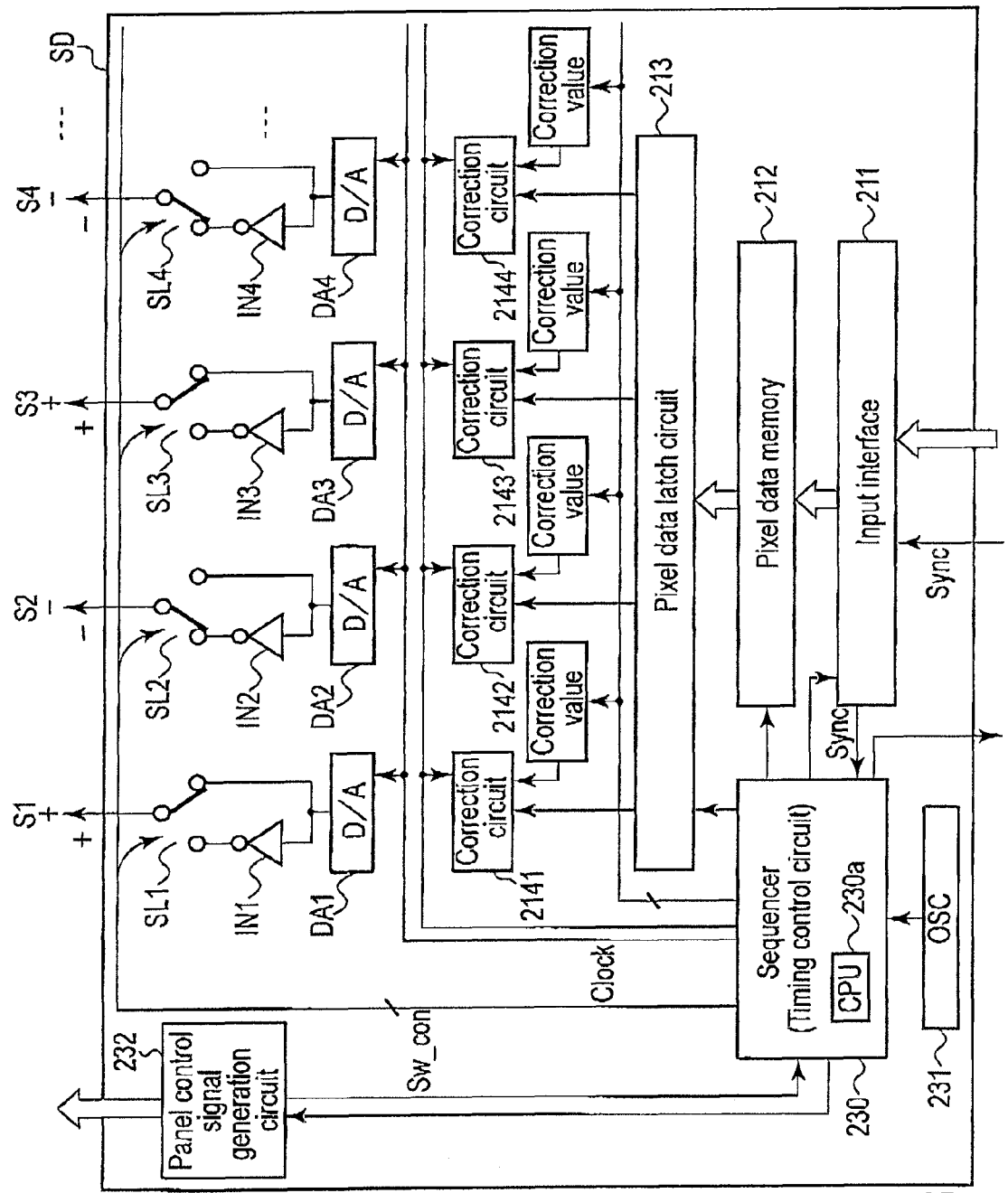
FIG. 16 is a schematic block diagram showing the internal configuration of a second drive circuit SD.

FIG. 16 is a schematic block diagram showing the internal configuration of a second drive circuit SD. The second drive circuit SD includes a plurality of circuits for converting digital pixel data to be supplied to each pixel into an analog pixel signal, amplifying the analog pixel signal, and outputting the amplified signal to a source line. The second drive circuit SD also includes an input interface 211. The input interface 211 is supplied with a sync signal Sync and image data from a drive IC ship CP. The image data from the input interface 211 is latched by an image data latch circuit 213 for one or more horizontal lines.

Image data items corresponding to source lines S (S1 to Sm: FIG. 16 shows source lines S1 to S4 as representative examples) are corrected by correction circuits 2141 to 2144, respectively. Then, the corrected data items are supplied to digital-to-analog converters DA1 to DA4 and converted into analog signals (pixel signals). The correction values to be corrected by the correction circuits 2141 to 2144 are suitable for the pixel array patterns shown in FIGS. 9-12. The correction values can be switched between odd and even lines. Actually, the drive circuit SD includes a gamma correction circuit, but it is not shown or described here.

The output pixel signals of the digital-to-analog converters DA1 to DA4 are generated as positive-electrode pixel signals and negative-electrode pixel signals. In the case of the digital-to-analog converter DA1, for example, a positive-electrode pixel signal is supplied to one terminal of the switch SL as it is, and a negative electrode pixel signal is generated by an inversion circuit IN1 and supplied to the other terminal of the switch SL1. One of the positive and negative electrode pixel signals generated from the digital-to-analog converter DA1 is selected by the switch SL1 and supplied to the source line S1. Similarly, one of the positive and negative electrode pixel signals generated from the digital-to-analog converter DA2 is selected by the switch SL2 and supplied to the source line S2. One of the positive and negative electrode pixel signals generated from the digital-to-analog converter DA3 is selected by the switch SL3 and supplied to the source line S3. One of the positive and negative electrode pixel signals generated from the digital-to-analog converter DA4 is selected by the switch SL4 and supplied to the source line S4. Column polarity reversion is achieved in the selection modes of the switches SL to SL4.

A sequencer (which can also be called a timing control circuit) 230 is synchronized with an external sync signal. The sequencer 230 generates different timing signals in response to an internal clock generated by an oscillator 231.

The sequencer 230 generates a timing signal in response to which the input interface 211 captures image data from outside, a timing signal in response to which an image data memory 212 captures image data from the input interface 211, and a timing signal in response to which the image data latch circuit 213 captures image data from the image data memory 212.

The sequencer 230 also generates a timing signal in response to which the correction circuits 2141 to 2144 correct image data, a clock and timing signal in response to which the digital-to-analog converters DA1 to DA4 convert image data into analog data, and a timing signal in response to which the switches SL1 to SL4 are operated.

The sequencer 230 may include a central processing unit (CPU) 230a and a memory (not shown). In accordance with software to be written to the memory, a timing processing operation and a data processing operation based upon the CPU 230a can be varied. Accordingly, for example, the correction values used in the correction circuits 2141 to 2144 can be adjusted in accordance with the type of a filter (pixel array pattern). The correction circuits 2141 to 2144 including an adjusting means can be called a gain control circuit or an adjustment circuit for the pixel signals.

A panel control signal generation circuit 232 generates a timing pulse for controlling a display operation of the liquid crystal display panel PNL in response to a given timing signal from the sequencer 230. For example, the panel control signal generation circuit 232 generates a gate driving pulse for driving the gate lines G (G1 to Gn). In order to be synchronized and associated with the sequencer 230, the panel control signal generation circuit 232 feeds the timing signal back to the sequencer 230. The sequencer 230 supplies the drive IC chip CP with a timing pulse based on which image data is received.

In the foregoing embodiment, the gain of each pixel signal is adjusted by a correction value when the pixel signal is digital data. However, the gain may be adjusted when the pixel signal is an analog signal.

As described above, image data output from the pixel data latch circuit 213 can be corrected by the correction circuits, thus making it possible to generate pixel signals of values suitable for the pixel array patterns shown in FIGS. 9-12. In the case of the pixel array pattern shown in FIG. 9, the gains of pixel signals supplied to R and G pixels are each assumed to be "1". In this case, the gains of pixel signals supplied to B1 and B2 signals may also be "1" or may be adjusted. For example, the gain of a pixel signal supplied to a B2 pixel can be controlled to be lower than that of a pixel signal supplied to a B1 pixel to set the sum of the gains of these pixel signals at "2." These gains can be adjusted by varying the correction values when the need arises. This adjustment is made in, for example, a manufacturing process and a test process for drive IC chips CP.

In the case of the pixel array pattern shown in FIG. 10, the gains of pixel signals supplied to R and G pixels are each assumed to be, for example, "2" and the gains of pixel signals supplied to B1 and B2 pixels are each assumed to be, for example, "1". Accordingly, RGB balance can be observed in an area for each composite color pixel. In this case, too, the gains of pixel signals supplied to B1 and B2 pixels can be adjusted by varying the correction values when necessary. This adjustment is made in, for example, a manufacturing process and a test process for drive IC chips CP.

In the case of the pixel array pattern shown in FIG. 11, the gains of pixel signals supplied to, for example, R and G pixels are each assumed to be, for example, "1". The gain of a pixel signal supplied to a B2 pixel is assumed to be "2/4" and that of a pixel signal supplied to a B1 pixel is assumed to be "6/4". Thus, each of the pixel signals of red, green and blue pixels is controlled to have a gain of "2" in an area for each composite color pixel.

In the case of the pixel array pattern shown in FIG. 12, the gains of pixel signals supplied to, for example, R and B pixels are each assumed to be, for example, "1". The gain of a pixel signal supplied to a B2 pixel is assumed to be "2/4" and that of a pixel signal supplied to a S1 pixel is assumed to be "6/4". Thus, each of the pixel signals of red, green and blue pixels is controlled to have a gain of "2" in an area for each composite color pixel.

In each of the foregoing embodiments, too, the gains of pixel signals supplied to B1 and B2 pixels can be adjusted by varying the correction values when necessary. This adjustment is made in, for example, a manufacturing process and a test process for drive IC chips CP. The distribution of gains of pixel signals supplied to B1 and B2 pixels can be adjusted by the light transmittance of filters. Therefore, the display device according to each of the foregoing embodiments includes an adjustment circuit capable of adjusting the distribution of gains of pixel signals supplied to at least B1 and B2 pixels.

FIG. 17 is a cross-sectional view schematically showing a display device according to another embodiment, in which an organic EL element is used in place of the liquid crystal display device LCD. Since the organic EL element is a self-emitting element, the display device shown in FIG. 17 is not provided with a light source other than the organic EL element.

The first substrate SUB1 and the second substrate SUB2 are opposed to each other. The first substrate SUB1 includes a first insulation substrate 110, a second insulating film 112, a third insulating film 113 and a rib 115 on its surface opposed to the second substrate SUB2.

The first insulation substrate 110 of the first substrate SUB1 includes switching elements SW1, SW2, SW3, . . . and organic EL elements OLED1, OLED2, OLED3, . . . on its surface opposed to the second substrate SUB2. In FIG. 16, three switching elements SW1 to SW3 and three organic EL elements OLED1 to OLED3 are shown as representative examples. The switching elements SW1 to SW3 are arranged on the first insulation substrate 110. Each of the switching elements SW1 to SW3 is, for example, a thin-film transistor (TFT) including a semiconductor layer SC. The switching elements SW1 to SW3 have the same configuration and here the configuration will be described more specifically on the basis of the switching element SW1.

The switching element SW is of a top-gate type, but it may be of a bottom-gate type. The semiconductor layer SC is formed on the first insulation substrate 110 and coated with a first insulating film 111. The first insulating film 111 is also formed on the first insulation substrate 110. On the first insulating film 111, a gate electrode WG of the switching element SW1 is formed. The gate electrode WG is coated with the second insulating film 112. The second insulating film 112 is also formed on the first insulating film 111. On the second insulating film 112, a source electrode WS and a drain electrode WD of the switching element SW1 are formed. The source electrode WS and the drain electrode WD are each brought into contact with the semiconductor layer SC. The source electrode WS and the drain electrode WD is coated with the third insulating film 113. The third insulating film 113 is also formed on the second insulating film 112.

The organic EL elements OLED1 to OLED3 are arranged on the third insulating film 113. The organic EL element OLED1 is electrically connected to the switching element SW1, the organic EL element OLED2 is electrically connected to the switching element SW2, and the organic EL element OLED3 is electrically connected to the switching element SW3. The organic EL elements OLED1 to OLED3 are each configured as a top emission type which emits white light toward the second substrate SUB. These organic EL elements OLED1 to OLED3 have the same structure.

The organic EL element OLED1 includes a pixel electrode PE1 formed on the third insulating film 113. The pixel electrode PE1 is brought into contact with the drain electrode WD of the switching element SW1 and electrically connected to the switching element SW1. Similarly, the organic EL element OLED2 includes a pixel electrode PE2 that is electrically connected to the switching element SW2, and the organic EL element OLED3 includes a pixel electrode PE3 that is electrically connected to the switching element SW3.

The organic EL elements OLED1 to OLED3 each include an organic light-emitting layer ORG and a common electrode CE. The organic light-emitting layers ORG of the organic EL elements OLED1 to OLED3 are white light-emitting layers that emit white light and are located on their respective pixel electrodes PE1 to PE3. The organic light-emitting layers ORG are all formed continuously in the organic EL elements OLED1 to OLED3. The common electrodes CE of the organic EL elements OLED1 to OLED3 are located on their respective organic light-emitting layers ORG. The common electrodes CE are all formed continuously in the organic EL elements OLED1 to OLED3.

In summary, the organic EL element OLED1 includes the pixel electrode PE1, organic light-emitting layer ORG and common electrode CE. Similarly, the organic EL element OLED2 includes the pixel electrode PE2, organic light-emitting layer ORG and common electrode CE. The organic EL element OLED3 includes the pixel electrode PE3, organic light-emitting layer ORG and common electrode CE.

Each of the organic EL elements OLED1 to OLED3 may include a hole injection layer and a hole transport layer between its corresponding one of the pixel electrodes PE1 to PE3 and its corresponding one of the organic light-emitting layers ORG. Furthermore, each of the organic EL elements OLED1 to OLED3 may include an electron injection layer and an electron transport layer between its corresponding one of the organic light-emitting layers ORG and its corresponding one of the common electrodes CE.

The organic EL elements OLED1 to OLED3 are separated from each other by ribs 115. The ribs 115 are formed on the third insulating film 113 to cover the edges of the pixel electrodes PE1 to PE3. Though not described in detail, the ribs 115 are formed on the third insulating film 113 in a grid pattern or a stripe pattern, for example.

Though not shown, it is desirable that the organic EL elements OLED1 to OLED3 should be sealed with a transparent sealing film. As the sealing film, a single film or a laminate film of transparent inorganic materials (e.g., silicon nitride and silicon oxide) can be used. Furthermore, a laminate film including thin films of inorganic materials and thin films of organic materials which are stacked one on another, can be used.

The second substrate SUB2 includes color filters CF1 to CF3 on its surface opposed to the first substrate SUB1 of the second insulation substrate 120. The color filter CF1 is a red (R) filter that is opposed to the organic EL element OLED1 to transmit light having a red wavelength, included in the white light. The color filter CF2 is a green (G) filter that is opposed to the organic EL element OLED2 to transmit light having a green wavelength, included in the white light. The color filter CF3 is a blue (B1 or B2) filter that is opposed to the organic EL element OLED3 to transmit light having a blue wavelength, included in the white light.

The first and second substrates SUB1 and SUB2 described above are bonded together by means of a transparent adhesive (or a filler) 130.

In the display device so configured, when one of the organic EL elements OLED1 to OLED3 emits light, the emitted light (white light) is output to the outside through its corresponding one of the color filters CF1, CF2 and CF3. The color filter CF1 transmits light having a red wavelength, included in the white light emitted from the organic EL element OLED1. The color filter CF2 transmits light having a green wavelength, included in the white light emitted from the organic EL element OLED2. The color filter CF3 transmits light having a blue wavelength, included in the white light emitted from the organic EL element OLED3. Color display is thus achieved.

In the foregoing display device, the pixels can be arranged in the pixel array patterns as show in FIGS. 9-12. Therefore, the display device can be configured to prevent light having a peak at the wavelength of about 460 nm from being emitted.

One aspect of the invention disclosed is as follows.

(1) A display device comprising:
a first substrate including a first pixel electrode, a second pixel electrode, a third pixel electrode, and a fourth pixel electrode; and
a color filter layer including a red filter opposed to the first pixel electrode, a green filter opposed to the second pixel electrode, a first blue filter opposed to the third pixel electrode and having a peak of transmittance at a wavelength shorter than 460 nm, and a second blue filter opposed to the fourth pixel electrode and having a peak of transmittance at a wavelength longer than 460 nm.

(2) The display device described in above (1), wherein the color filter layer is formed over a second substrate opposed to the first substrate.

(3) The display device described in above (1), wherein the color filter layer is formed over the first substrate.

(4) The display device described in above (1), further comprising:
a liquid crystal layer held between the first substrate and the second substrate; and
a backlight unit disposed on a back of the first substrate, wherein the backlight unit includes:
a light guide plate having an emitting surface opposed to the first substrate and en incident surface that crosses the emitting surface;
a first white light source opposed to the incident surface and having a peak of emission spectrum at a wavelength shorter than 460 nm; and
a second white light source opposed to the incident surface and having a peak of emission spectrum at a wavelength longer than 460 nm.

(5) The display device described in above (4), wherein the first white light source and the second white light source include a blue light emitting diode and a yellow fluorescent substance.

(6) The display device described in above (4), wherein the first white light source and the second white light source include quantum dots.

(7) The display device described in above (1), wherein the first substrate includes a white light-emitting layer and a common electrode, the white light-emitting layer being located on the first to fourth pixel electrodes and the common electrode being located on the white light-emitting layer.

(8) The display device described in above (1), wherein the red filter is arranged in a first column in a first direction, the green filter is arranged in a second column in the first direction, the first blue filter and the second blue filter are arranged in a third column in the first direction, and the first blue filter and the second blue filter are also arranged in a second direction that crosses the first direction.

(9) The display device described in above (1), wherein the red filter and the green filter are arranged alternately in a first column in a first direction, and the first blue filter and the second blue filter are arranged in a second column in the first direction.

(10) The display device described in above (1), further comprising:
a first column extending in a first direction and including a plurality of red filters;
a second column extending in the first direction, including a plurality of green filters, and arranged next to the first column; and
a third column extending in the first direction, including a plurality of first blue filters and a plurality of second blue filters, and arranged next to the second column,
wherein the first blue filters and the second blue filters are arranged in a second direction that crosses the first direction.

(11) The display device described in above (1), further comprising:
a first column extending in a first direction and including a plurality of red filters and a plurality of green filters; and
a second column extending in the first direction, including a plurality of first blue filters and a plurality of second blue filters, and arranged next to the first column,
wherein the first blue filters and the second blue filters are arranged in a second direction that crosses the first direction.

(12) The display device described in above (1), wherein the first blue filter has an area that is larger than an area of the second blue filter.

(13) The display device described in above (1), further comprising:
a red pixel including the first pixel electrode, a green pixel including the second pixel electrode, a first blue pixel including the third pixel electrode, and a second blue pixel including the fourth pixel electrode; and
a drive circuit which supplies a pixel signal to each of the red pixel, the green pixel, the first blue pixel and the second blue pixel,
wherein the drive circuit includes a circuit which adjusts a gain of pixel signals supplied to at least the first blue pixel and the second blue pixel, While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate including a first pixel electrode, a second pixel electrode, a third pixel electrode, and a fourth pixel electrode; and
   a color filter layer including a red filter opposed to the first pixel electrode, a green filter opposed to the second pixel electrode, a first blue filter opposed to the third pixel electrode and having a peak of transmittance at a wavelength shorter than 460 nm, and a second blue filter opposed to the fourth pixel electrode and having a peak of transmittance at a wavelength longer than 460 nm.

2. The display device of claim 1, wherein the color filter layer is formed over a second substrate opposed to the first substrate.

3. The display device of claim 1, wherein the color filter layer is formed over the first substrate.

4. The display device of claim 1, further comprising:
   a liquid crystal layer held between the first substrate and the second substrate; and
   a backlight unit disposed on a back of the first substrate, wherein the backlight unit includes:
      a light guide plate having an emitting surface opposed to the first substrate and an incident surface that crosses the emitting surface;
      a first white light source opposed to the incident surface and having a peak of emission spectrum at a wavelength shorter than 460 nm; and
      a second white light source opposed to the incident surface and having a peak of emission spectrum at a wavelength longer than 460 nm.

5. The display device of claim 4, wherein the first white light source and the second white light source include a blue light emitting diode and a yellow fluorescent substance.

6. The display device of claim 4, wherein the first white light source and the second white light source include quantum dots.

7. The display device of claim 1, wherein the first substrate includes a white light-emitting layer and a common electrode, the white light-emitting layer being located on the first to fourth pixel electrodes and the common electrode being located on the white light-emitting layer.

8. The display device of claim 1, wherein the red filter is arranged in a first column in a first direction, the green filter is arranged in a second column in the first direction, the first blue filter and the second blue filter are arranged in a third column in the first direction, and the first blue filter and the second blue filter are also arranged in a second direction that crosses the first direction.

9. The display device of claim 1, wherein the red filter and the green filter are arranged alternately in a first column in a first direction, and the first blue filter and the second blue filter are arranged in a second column in the first direction.

10. The display device of claim 1, further comprising:
    a first column extending in a first direction and including a plurality of red filters;
    a second column extending in the first direction, including a plurality of green filters, and arranged next to the first column; and
    a third column extending in the first direction, including a plurality of first blue filters and a plurality of second blue filters, and arranged next to the second column,
    wherein the first blue filters and the second blue filters are arranged in a second direction that crosses the first direction.

11. The display device of claim 1, further comprising:
    a first column extending in a first direction and including a plurality of red filters and a plurality of green filters; and
    a second column extending in the first direction, including a plurality of first blue filters and a plurality of second blue filters, and arranged next to the first column,
    wherein the first blue filters and the second blue filters are arranged in a second direction that crosses the first direction.

12. The display device of claim 1, wherein the first blue filter has an area that is larger than an area of the second blue filter.

13. The display device of claim 1, further comprising:
    a red pixel including the first pixel electrode, a green pixel including the second pixel electrode, a first blue pixel including the third pixel electrode, and a second blue pixel including the fourth pixel electrode; and
    a drive circuit which supplies a pixel signal to each of the red pixel, the green pixel, the first blue pixel and the second blue pixel,
    wherein the drive circuit includes a circuit which adjusts a gain of pixel signals supplied to at least the first blue pixel and the second blue pixel.

* * * * *

UNITED STATES PATENT AND TRADEMARK OFFICE
CERTIFICATE OF CORRECTION

PATENT NO.        : 9,523,802 B2                                          Page 1 of 1
APPLICATION NO.   : 14/821188
DATED             : December 20, 2016
INVENTOR(S)       : Akira Sakaigawa et al.

It is certified that error appears in the above-identified patent and that said Letters Patent is hereby corrected as shown below:

On the Title Page

At Foreign Patent Documents:
Please replace "JP 2011-066534" with -- JP 2011-100025 --

Signed and Sealed this
Twenty-first Day of March, 2017

Michelle K. Lee
*Director of the United States Patent and Trademark Office*